(12) United States Patent
Triandopoulos et al.

(10) Patent No.: US 9,871,785 B1
(45) Date of Patent: Jan. 16, 2018

(54) FORWARD SECURE ONE-TIME AUTHENTICATION TOKENS WITH EMBEDDED TIME HINTS

(71) Applicant: EMC IP Holding Company LLC, Hopkinton, MA (US)

(72) Inventors: Nikolaos Triandopoulos, Arlington, MA (US); Ari Juels, Brookline, MA (US); John Brainard, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 107 days.

(21) Appl. No.: 13/828,503

(22) Filed: Mar. 14, 2013

(51) Int. Cl.
*H04L 29/06* (2006.01)

(52) U.S. Cl.
CPC ............. *H04L 63/0838* (2013.01)

(58) Field of Classification Search
CPC ... H04L 9/0863; H04L 9/0891; H04L 9/3228; H04L 63/0807; H04L 9/3213; H04L 2209/80
USPC .................. 713/151–169; 726/2–7
See application file for complete search history.

(56) References Cited

U.S. PATENT DOCUMENTS

| | | | | |
|---|---|---|---|---|
| 7,363,494 B2 * | 4/2008 | Brainard et al. | ............. | 713/168 |
| 7,904,946 B1 * | 3/2011 | Chu | ............. | H04L 63/067 726/10 |
| 8,752,146 B1 * | 6/2014 | van Dijk et al. | ............. | 726/6 |
| 2002/0166048 A1 * | 11/2002 | Coulier | ............. | 713/169 |
| 2007/0050635 A1 * | 3/2007 | Popp | ............. | H04L 9/0863 713/185 |
| 2007/0186105 A1 * | 8/2007 | Bailey et al. | ............. | 713/168 |
| 2008/0270791 A1 * | 10/2008 | Nystrom et al. | ............. | 713/159 |
| 2009/0125997 A1 * | 5/2009 | Cook | ............. | G06F 21/34 726/6 |
| 2011/0321146 A1 * | 12/2011 | Vernon | ............. | G06F 21/35 726/7 |
| 2012/0124656 A1 * | 5/2012 | Senac | ............. | H04L 9/3213 726/9 |
| 2014/0223527 A1 * | 8/2014 | Bortz | ............. | H04L 63/08 726/6 |

* cited by examiner

*Primary Examiner* — Amir Mehrmanesh
(74) *Attorney, Agent, or Firm* — Ryan, Mason & Lewis, LLP

(57) ABSTRACT

Forward-secure one-time authentication tokens are provided with embedded time hints. A token generates a passcode for presentation to an authentication server by determining a current state of the token; generating a user authentication passcode based on the current state, wherein the generated user authentication passcode comprises an embedded time hint; and communicating the generated user authentication passcode to the authentication server. The passcode may be generated with the embedded time hint, for example, each time a user authentication passcode is generated or upon demand when a user authentication passcode is generated. A server processes a user authentication passcode by receiving the user authentication passcode, wherein the received user authentication passcode comprises an embedded time hint; and determining a time interval to search for another user authentication passcode based on the embedded time hint.

64 Claims, 12 Drawing Sheets

FORWARD SECURE ONE-TIME AUTHENTICATION TOKENS WITH EMBEDDED TIME HINTS

CROSS-REFERENCE TO RELATED APPLICATION

The present application is related to U.S. patent application Ser. No. 13/826,993, filed contemporaneously herewith, entitled "Time Synchronization Solutions for Forward-Secure One-Time Authentication Tokens," now U.S. Pat. No. 9,654,467, incorporated by reference herein.

FIELD OF THE INVENTION

The present invention relates generally to techniques for improving resilience to forward clock attacks.

BACKGROUND

One-time authentication tokens produce a series of unpredictable one-time passcodes as second authentication factors for the authentication of users to remote servers. Passcodes are typically generated on a regular time basis, i.e., in specified time intervals often called epochs. For instance, the widely used RSA SecurID® user authentication token commercially available from RSA Security Inc. of Bedford, Mass., U.S.A., produces passcodes every one minute. Passcodes are unpredictable as they get produced in a pseudorandom manner using some secret state that is stored at the token and also shared with the server.

Tokens can be implemented through hardware or software. For software tokens, an application is responsible for securely storing the secret state and producing "on demand" the specific series of passcodes that starts from the point in time corresponding to the time the application is launched. Therefore, software tokens always receive as input the current time of the device on which the application runs. For instance, a token application on a mobile phone takes as input the current time of the device.

The dependence on the current device time, however, may create problems with respect to the usability and/or security of the application due to, in general, time synchronization issues between the token device and the authentication server. In addition, normal token operation requires some loose synchronization (or slack) between the token and the server, to account for, e.g., time zone differences and minor deviations between the token and server clocks.

If the user is able to manipulate the device time, however, the key update application will compute the wrong key for the current actual time. When the altered device time is later in time than the current actual time (referred to as a forward clock attack), the user or attacker is able to obtain a key that will be valid for a later time. In addition, the internal state of a forward secure key-update tree is locked to the future device time. Accordingly, if the user or attacker later corrects the device time to the actual time, then the forward-secure key generation module becomes blocked/locked to a future time, and thus the system using the forward-secure keys may remain unusable for a certain amount of time (e.g., until the time corresponding to the forward clock attack point is reached). In general, the key generation module of the device will not be synchronized with the corresponding server (that makes use of the produced keys) as the server (which is expected to accurately keep track of the actual time) will receive a passcode keyed with a state that corresponds to a future/forwarded point in time, and not with the current device time.

U.S. patent application Ser. No. 13/728,271, filed Dec. 27, 2012, entitled "Forward Secure Pseudorandom Number Generation Resilient to Forward Clock Attacks," now U.S. Pat. No. 9,083,515, incorporated by reference herein, discloses pseudorandom generators (FS-PRNGs) that are forward secure as well as resilient to such forward clock attacks. These FS-PRNGs translate a detected time-synchronization problem to a change of the range of the pseudorandom numbers produced by the generator, thus also an increase to the search space of the server. Nonetheless, a need remains for improved techniques for token-side detection of such forward clock attacks, as well as new techniques for server-side detection and prevention of such attacks that do not affect the search space of the server. A further need exists for techniques for communicating a detected forward clock attack to the server without affecting the underlying FS-PRNG being used, while ensuring that such forward clock attack prevention is enforced.

SUMMARY OF THE INVENTION

The present invention in the illustrative embodiments described herein provides forward-secure one-time authentication tokens with embedded time hints. According to one aspect of the invention, a token generates a passcode for presentation to an authentication server by determining a current state of the token; generating a user authentication passcode based on the current state, wherein the generated user authentication passcode comprises an embedded time hint; and communicating the generated user authentication passcode to the authentication server.

The passcode may be generated with the embedded time hint, for example, each time a user authentication passcode is generated or upon demand when a user authentication passcode is generated. For example, the passcode may be generated with the embedded time hint upon detection of a forward clock attack. The embedded time hint comprises, for example, an indication of a last used device time during a generation of a user authentication passcode.

According to a further aspect of the invention, embedded time hints may be communicated using a verification-independent auxiliary channel or a verification-dependent auxiliary channel. The verification-dependent auxiliary channel and the user authentication passcode optionally employ a second forward-secure pseudorandom generator that is independent of a first forward-secure pseudorandom generator employed by the verification-dependent auxiliary channel and the user authentication passcode. The second forward-secure pseudorandom generator can generate seeds based on a low-rate time based hash chain, for example, on-demand.

Generally, the second forward-secure pseudorandom generator embeds a time hint indicating a current epoch of the first forward-secure pseudorandom generator. The authentication server can evaluate a received passcode that failed using seeds generated by the first forward-secure pseudorandom generator by employing seeds generated by the second forward-secure pseudorandom generator. The authentication server optionally searches the seeds generated by the second forward-secure pseudorandom generator in a window of a hash chain. The authentication server optionally employs the embedded time hint to update a search space with respect to the first forward-secure pseudorandom generator if the received passcode is verified using the seeds generated by the second forward-secure pseudorandom generator.

According to another aspect of the invention, a server processes a user authentication passcode by receiving the user authentication passcode, wherein the received user authentication passcode comprises an embedded time hint; and determining a time interval to search for another user authentication passcode based on the embedded time hint. The server can optionally evaluate the embedded time hint upon one or more failed authentication attempts, to reduce a search space for another user authentication passcode. The server optionally receives a notification of the embedded time hint, such as a flag.

The disclosed exemplary forward-secure one-time authentication tokens with embedded time hints overcome one or more of the problems associated with the conventional techniques described previously. These and other features and advantages of the present invention will become more readily apparent from the accompanying drawings and the following detailed description.

DETAILED DESCRIPTION

Figure 1:
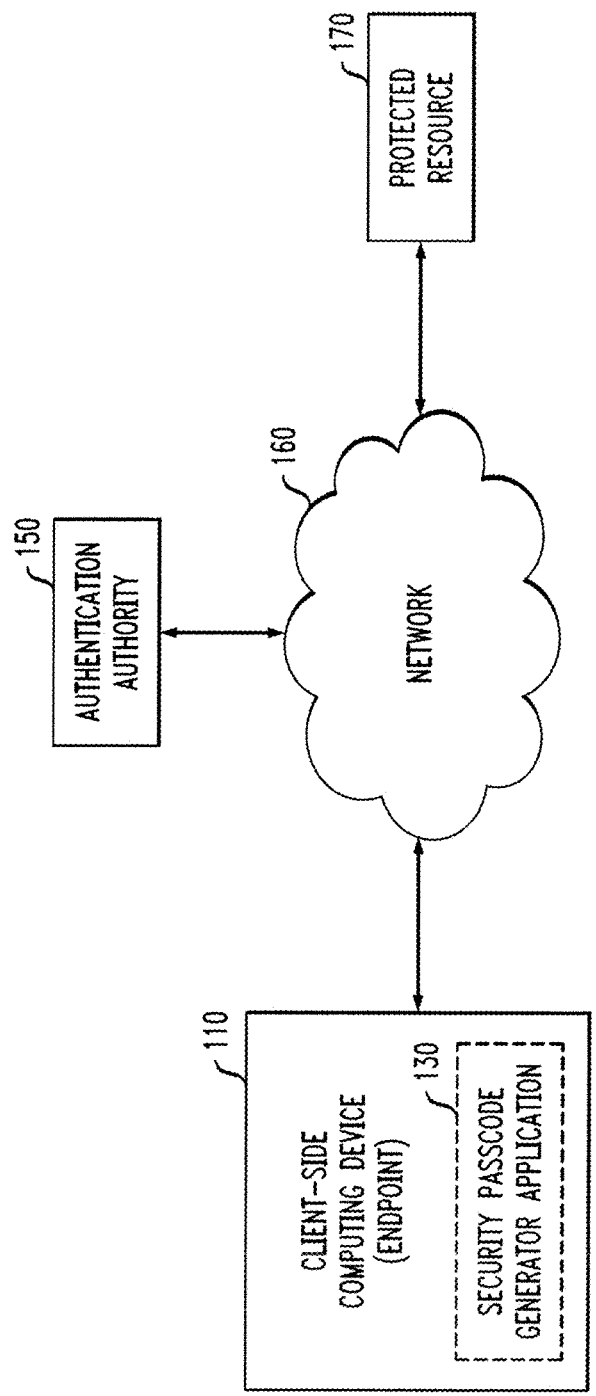
FIG. 1 illustrates an exemplary network environment in which the present invention can operate.

FIG. 1 illustrates an exemplary network environment in which a Secure Client-Server Communications application of the present invention can operate. As shown in FIG. 1, an exemplary client-side computing device (CSCD) 110 communicates with a protected resource 170 over a network 160. In an exemplary implementation, the user must authenticate with an authentication authority 150 using a passcode generated by a security passcode-generator application 130 (hereinafter, referred to as security passcode app 130) before obtaining access to the protected resource 170. The network 160, may comprise, for example, a global computer network such as the Internet, a wide area network (WAN), a local area network (LAN), a satellite network, a telephone or cable network, or various portions or combinations of these and other types of networks.

The user of the CSCD 110 is authenticated with the protected resource 170 using a one-time variable key that may be generated in accordance with the present invention.

It is to be appreciated that a given embodiment of the disclosed system may include multiple instances of CSCD 110, security passcode app 130, authentication authority server 150 and protected resource 170, and possibly other system components, although only single instances of such components are shown in the simplified system diagram of FIG. 1 for clarity of illustration.

The security passcode app 130 is shown in FIG. 1 as being implemented by the CSCD 110. The security passcode app 130 may be implemented, for example, using the RSA SecurID® user authentication token commercially available from RSA Security Inc. of Bedford, Mass., U.S.A. The security passcode app 130 may be a server or other type of module that is accessible over the network 160, or it may be a software component resident on the CSCD 110. As another alternative, security passcode app 130 may be distributed over multiple devices, one of which may be the CSCD 110. Thus, while the present invention is illustrated herein using a security passcode app 130 executing on the CSCD 110, such that the CSCD 110 can read a given passcode (or another authentication value) directly from the security passcode app 130, other implementations are within the scope of the present invention, as would be apparent to a person of ordinary skill in the art. For example, for other security passcode apps 130 that are not connectable to a computer or other user device in this manner, the user may manually enter a password or another value displayed by the security passcode app 130 at the time of the attempted access. In addition, for a detailed discussion of a modular and/or component implementation of a token-based authentication technique, see, for example, U.S. Pat. No. 7,562,221 to Nyström et al., assigned to the assignee of the present invention and incorporated by reference herein.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention. The CSCD 110 may also be referred to herein as simply a "user." The term "user" should be understood to encompass, by way of example and without limitation, a user device, a person utilizing or otherwise associated with the device, or a combination of both. A password or other authentication information described as being associated with a user may, for example, be associated with a CSCD device 110, a person utilizing or otherwise associated with the device, or a combination of both the person and the device.

The authentication authority 150 is typically a third party entity that processes authentication requests on behalf of web servers and other resources, and verifies the authentication information that is presented by a CSCD 110.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

Figure 2:
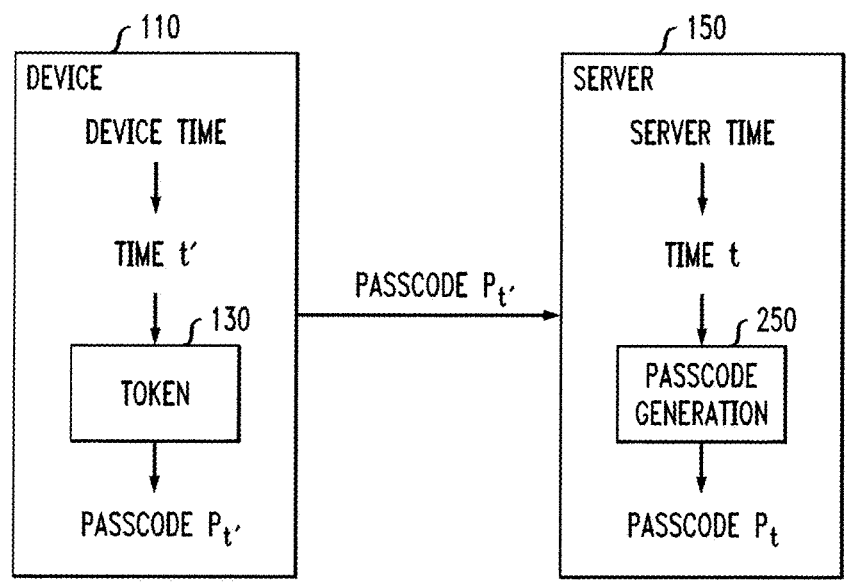
FIG. 2 illustrates a user device attempting to authenticate to a server.

FIG. 2 illustrates a user device 110 attempting to authenticate to a server 150. As indicated above, the dependence on the current time of the device 110 may create problems with respect to the usability and/or security of the application because, in general, of time synchronization issues between the token device 130 and the authentication server 150. In particular, normal token operation requires some loose synchronization between the token 130 and the server 150. Indeed, the user device 110 authenticates to the server 150 by providing the passcode $P_{t'}$ that corresponds to the current time t' (at the epoch level, e.g., minute) that the device 110 knows. Then, as shown in FIG. 2, the server 150 must authenticate a user who provides a candidate passcode $P_{t'}$ by first recomputing the passcode $P_t$ using a passcode generation block 250 that corresponds to the current time t (at the epoch level) that the server 150 knows, and then accepting the submitted passcode if and only if $P_{t'}=P_t$. It is clear that if t'≠t, that is, if the token 130 and server 150 are not synchronized with each other, even a legitimate user cannot be authenticated.

Figure 3:
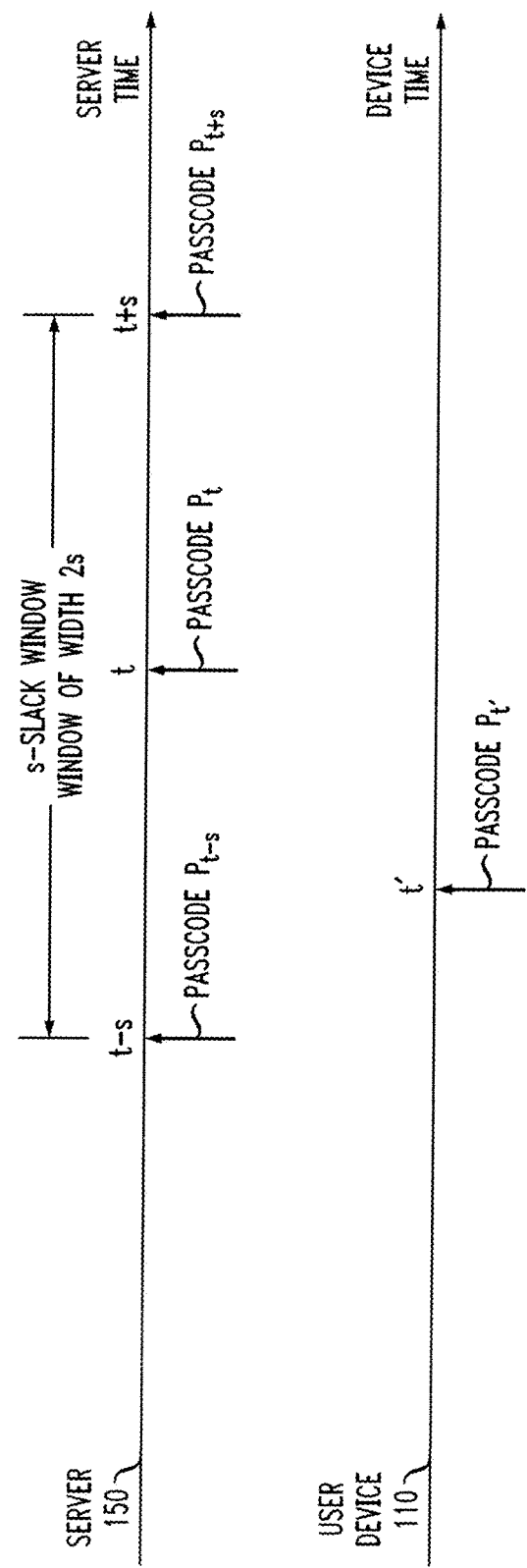
FIG. 3 illustrates the use of a slack window s to address a de-synchronization problem.

FIG. 3 illustrates the use of a slack window s to address the above de-synchronization problem. The slack window s allows some slack between the times t and t' of the server 150 and device 110, respectively. In particular, as shown in FIG. 3, assuming that a bidirectional time difference of s time epochs must be tolerated (providing a slack window of width 2s), the server 150 will accept $P_{t'}$ if it belongs in the following computed set of passcodes:

$$\{P_{t-s}, P_{t-s+1}, \ldots, P_{t-1}, P_t, P_{t+1}, \ldots, P_{t+s-1}, P_{t+s}\}.$$

This creates an extra overhead of 2s at the server 150, as in the worst case 2s+1 instead of 1 passcode must be computed at the server 150, but it provides a natural solution to the practical problem of small non-synchronization. Indeed, small time discrepancies may occur in practice, for example, as users travel to different times zones and often incorrectly set the new time or as similar erroneous situations occur due to daylight-saving time changes. Such scenarios are referred to as a small de-synchronization (de-synch) case, and any bidirectional discrepancy of more then s is referred to as a large de-synchronization case. Note that the value of s need not be very large. A typical value of s may be 70 (e.g., for tolerating at least an hour-long of discrepancy plus some smaller slack of 10 minutes due to general possible de-synchronization problems).

Therefore, small de-synch cases can be tolerated using this known search-window verification or simpler s-slack window technique described above. In what follows, it is assumed that an s-slack window mechanism is in place at the server. However, things can be much more complicated when time discrepancies occur that are larger then s. At a minimum, if a user incorrectly sets up its device time t' to a value that is away by more than s epochs from (smaller or larger than) the (true) time t at the server, then the user will be effectively locked out as any authentication attempt will fail.

Security and Usability Issues

Due to accidental user-generated time changes to personal devices, or due to the more serious so-called forward-clock attacks, one-time authentication tokens inherently suffer from time-synchronization issues that, in turn, introduce security and/or usability problems. These problems are particularly harder when forward security is employed, for instance in a token version that supports the silent alarms security feature. See, for example, U.S. patent application Ser. No. 13/404,788, filed Feb. 24, 2012, entitled "Methods and Apparatus for Silent Alarm Channels Using One-Time Passcode Authentication Tokens," now U.S. Pat. No. 9,515,989, incorporated by reference herein.

Forward-Security in Tokens

Specifically, recent advancements of one-time authentication tokens employ the use of forward security for generating the series of unpredictable pseudorandom passcodes. For example, U.S. patent application Ser. No. 13/334,709, filed Dec. 23, 2011, entitled "Methods and Apparatus for Generating Forward Secure Pseudorandom Numbers," now U.S. Pat. No. 9,008,303, incorporated by reference herein, describes a forward-secure hierarchical pseudorandom number generator (PRNG) that produces the passcodes. There, the secret state used to produce passcodes evolves over time so that a current state cannot lead to the computation of a previous state. The benefits of such a forward-secure system is that certain attacks against the token can be tolerated.

In particular, forward-secure PRNGs can be used in combination with an auxiliary low-bandwidth channel (implemented via the transmitted authentication passcodes) so that the token can support the silent-alarm functionality. For a discussion of an exemplary low-bandwidth auxiliary channel, see, for example, U.S. patent application Ser. No. 13/404,780, filed Feb. 24, 2012, entitled "Method and Apparatus for Embedding Auxiliary Information in One-Time Passcode Authentication Tokens," now U.S. Pat. No. 8,984,609, incorporated by reference herein. Silent alarms are described, for example, in U.S. patent application Ser. No. 13/249,957, filed Sep. 30, 2011, entitled "Methods and Apparatus for Secure and Reliable Transmission of Messages Over a Silent Alarm Channel," now U.S. Pat. No. 8,788,817, incorporated by reference herein. The latter, for instance, ensures that, even if a token is completely compromised by an attacker (e.g., the attacker fully controls the device and thus learns the secret state of the token), the token can send to the server a secret alert message of the form "I have been breached" embedded to any passcode produced in the future. This will then allow the server to detect a user impersonation attack via an authentication token that is cloned through full compromise of the host device.

Concrete Attack Scenarios

First, two concrete scenarios are considered related to (small or large) de-synch cases that affect the usability and security of forward-secure software tokens when the device clock is erroneously, by the legitimate user, or maliciously, by an attacker that gets access to the device, changed to an incorrect time and the token application is then launched. Let t be the true time at the server: Without loss of generality, it is assumed that time t stays always correct (it doesn't change).

1. Backward Time Change: In this case, the device time t', initially equal to t, is changed backward to an epoch t" less than t'. Let D be the true time (epoch) that the token application was last launched to generate a passcode $P_D$. Then, consider a token being launched at time d:

(a) If d≥D, then usability is potentially partially affected and security is not affected. A new passcode $P_d$ is generated and, if this is used for authentication, then $P_d$ has discrepancy s'=t'-t" with respect to the server's correct corresponding passcode $P_t$. Assuming an s-slack window, if s'≤s then the server will accept the passcode; otherwise, the passcode will be rejected.

(b) If d<D, then usability is radically affected but security is not affected (due to forward security). When the application is launched, the forward-security feature will not allow generating a passcode, because the current state of epoch D cannot lead to an older state of epoch d.

(c) In both cases, if the device time is later corrected, the token will continue to operate normally.

Overall, such backwards time changes, either erroneous or malicious, can result in partial or radical usability issues only.

2. Forward Time Change: In this case, the device time t', initially equal to t, is changed forward to an epoch t" greater than t', s'=t"−t'. Let D be the true time (epoch) that the token application is next launched to generate a passcode $P_D$.
   (a) Depending on whether s'≤s, usability is potentially partially affected and security is not affected, similarly to case 1(a) above.
   (b) If the device time is later corrected, then consider a token being launched at time d:
   i. Depending on whether d≤D, usability is potentially partially affected, similarly to case 1(a), or usability is radically affected, similarly to case 1(b) above.
   ii. However, security is severely affected, trivially because a passcode $P_D$ that is valid sometime in the future is produced; in particular, this inherent weakness for software tokens may lead to severe security problems either because passcode $P_D$ may leak to an attacker, even if it is produced by a legitimate user, or because $P_D$ may be produced directly by an attacker. This attack is referred to as a forward clock attack.

Overall, such forward time changes, either erroneous or malicious, can result in partial or significant usability issues but always in significant security issues.

It is observed that, especially in an adversarial setting where an attacker temporarily gains access to the user's device, desynchronization can affect usability through certain kind of denial of service (DOS) attacks and also security through a forward clock attack (FCA). The DOS attack is related to the fact that the user is blocked from authentication, already at the token, simply by not being provided with a passcode by the token. This event is referred to as a BLOCK event.

Figure 4:
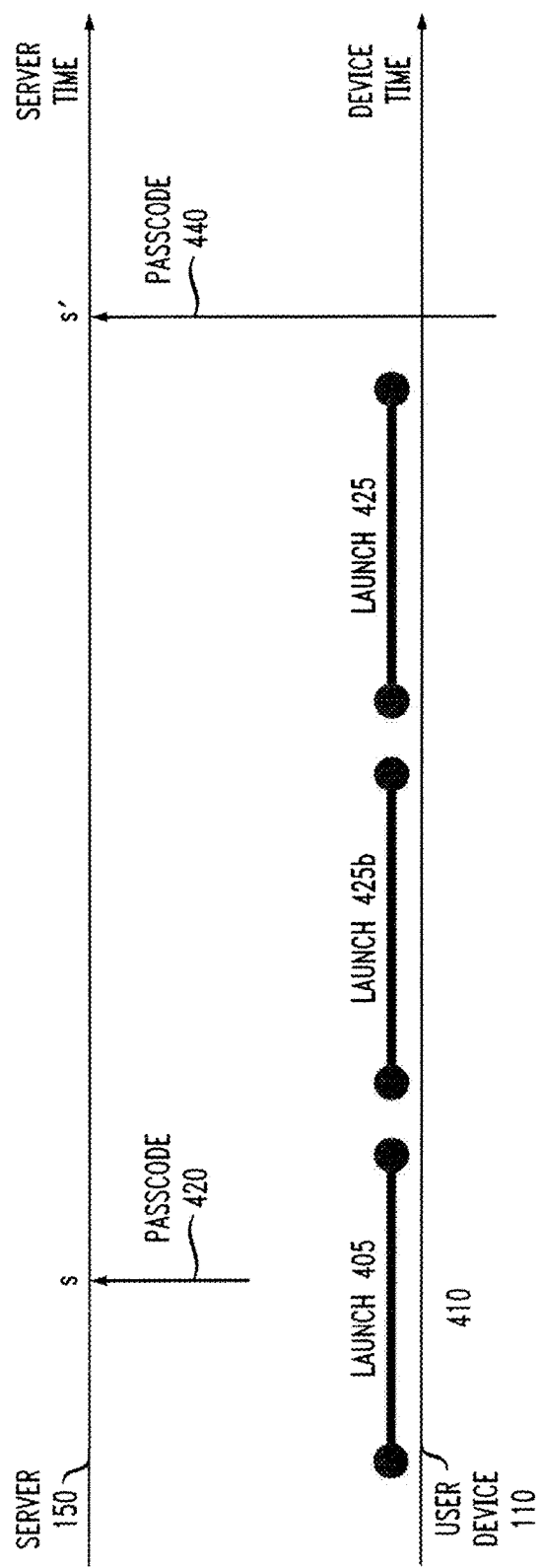
FIG. 4 illustrates an exemplary forward clock attack.

FIG. 4 illustrates an exemplary forward clock attack. As shown in FIG. 4, a user of the CSCD 110 attempts to log in to a protected resource, such as server 150, at a time 410. In order to access the server 150, the user launches the security passcode app 130 at a current device time 405. As discussed hereinafter, if a valid passcode 420 is presented by the user, the user will be granted access to the server 150, if the difference between the current device time at time 410 and the current server time at a time s when the passcode 420 is presented to the server 150 is within a predefined threshold.

Thereafter, the user, such as an attacker, changes the device time to a future time and launches the security passcode app 130 at a current device time 425 to obtain a new current or future passcode 440. The new passcode 440 is not presented, however, to the server 150 until the future server time at time s'. The device time can optionally or likely be reset by the attacker or the legitimate user, respectively, to the correct current time.

As discussed hereinafter, aspects of the present invention employ a forward clock detection mechanism to indicate a synhronization problem between the user device 110 and the server 150 and thereby detect and prevent a forward clock attack, if the user launches the security passcode app 130 at time 425b after an adversarial passcode collection at time 425 but before an attempted login by the attacker at server time s'. (When the server time and device time are again synchronized and if the user happens to launch the security passcode app 130 at a time after the server time s', then the forward clock attack cannot be detected by either the user device or the server based only on timing information.) Aspects of the present invention employ improved techniques for generating forward secure pseudorandom numbers that are resilient to such forward clock attacks. According to one aspect of the invention, by using a detection test, the next passcode rule and a communication method, the user device 110 can be synchronized with the server.

Strong Forward Clock Attacks

As discussed above in conjunction with FIG. 3, a general counter-measurement to tolerate problems due to clock drifting, even under normal device operation, or erroneous device time changes by the users, is to employ the s-slack window policy at the server 150. This successfully takes care of small time discrepancies that are expected between the token and the server. The slack window technique allows the server 150 to check a received passcode in a small window, i.e., a small range of passcodes. Thus, time-synchronization issues are considered for time changes that fall outside this window, i.e., large de-synch cases.

Figure 5:
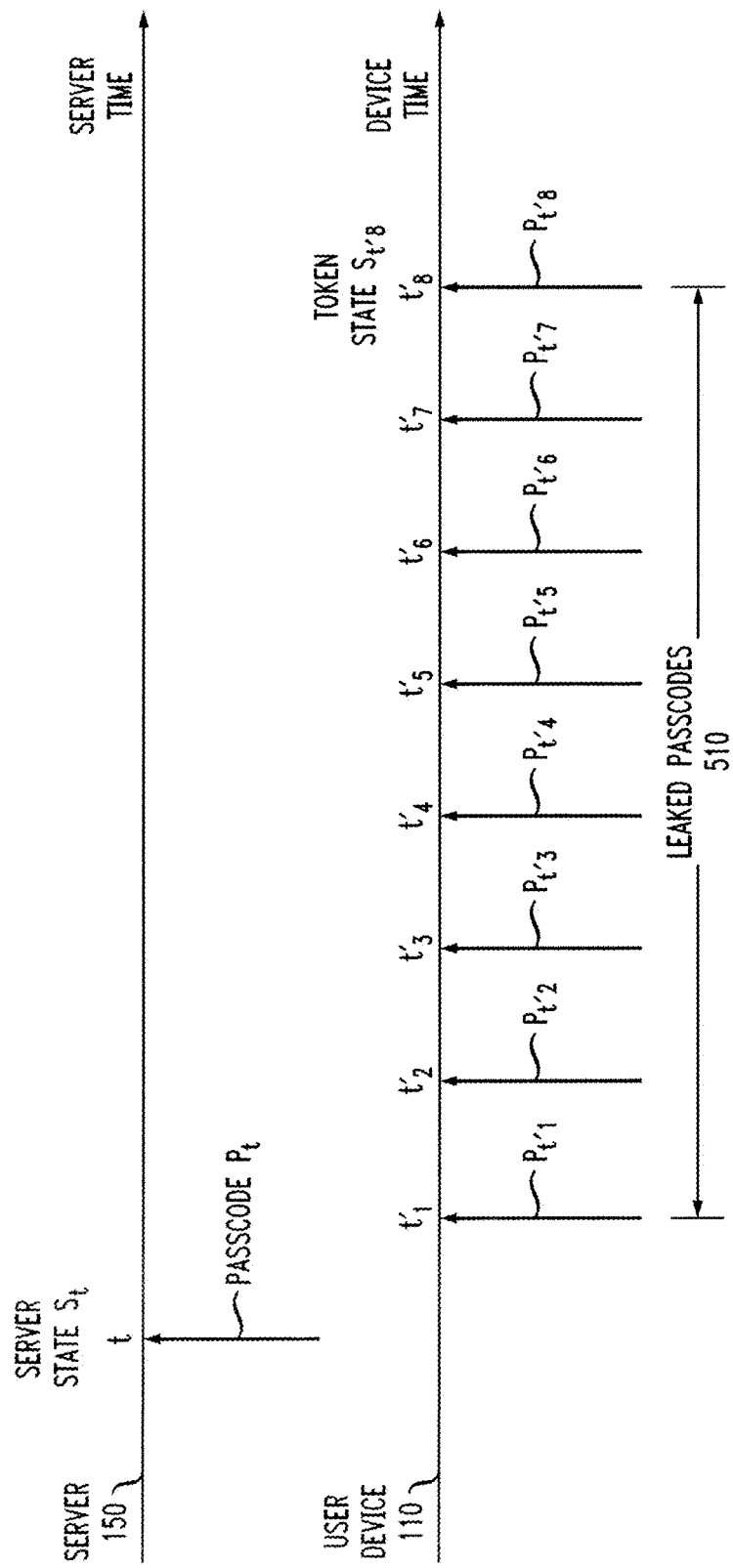
FIG. 5 illustrates the leakage of passcodes during a strong version of a forward clock attack.

Strong Forward Clock Attack: An attacker gets access to the device 110, and starts repeatedly setting the clock forward by a fixed long-enough time quantum (e.g., an hour), starting by an epoch that is outside the slack window s of the current correct epoch, such as time $t'_1$, each time launching the token 130 to get a new generated passcode, until some time T, such as time $t'_8$, that is far in the future has been reached, and finally corrects the clock to the correct current time (time $t'_1$). Even though the device time is corrected by the attacker, the internal token's state remains in the future (e.g., the new FS-PRNG state of the token is of epoch $t'_8$). FIG. 5 illustrates the leakage of passcodes during a forward clock attack. The user does not learn about this action and the leaking of this large set 510 of valid-in-the-future passcodes. At some attack time T'<T, the attacker makes use of the appropriate stolen passcode.

Aspects of the present invention provide solutions for this (inherent for software tokens) attack with respect to:

Security—Consider two properties, namely, eventual detection and/or immediate prevention of the strong forward clock attack (s-FCA). Detection refers to identifying at the server 150, even at a time much later than T', that an attacker performed a forward clock attack to get one or more future passcodes, whereas prevention means that at some time before the "stolen-passcode usage" or, for simplicity, attack time T' the token 130 communicated information to the server so that the stolen passcodes are (effectively) inactivated or revoked.

Usability—The ability of the user to use the software token 130 in the most transparent way, namely, when the token application is launched, a passcode is generated and provided to the user, and when the user transcribes this passcode in an authentication attempt, the provided passcode is successfully accepted by the server 150.

A strong forward clock attack (s-FCA) should be contrasted against the plain forward-clock attack (FCA) according to which: An attacker gets access to the device 110, forwards the clock to an attack time T in the future that is outside the slack window s of the current time, launches the token application 130 to get a passcode and then corrects the clock to the current time. The user does not learn about the leaking of this one valid-in-the-future passcode.

Neither detection nor prevention of s-FCA attacks is possible if the user does not launch the token application 130 on his/her device before the beginning of the slack window corresponding to the attack time T'. This is because the token application 130 is only party than can possible initially detect (and therefore appropriately react to also communicate this detection to the server 150 which, in turn, can prevent) an s-FCA attack. And this token-side detection, discussed further below, can only happen by keeping and processing some state at the token 130, which can only happen by launching the token application 130. The requirement that this happens prior to the slack window s corresponding to the attack time T' comes so that the detection time is clearly prior to the attack time window.

No prevention of s-FCA or FCA is possible if the user does not attempt an authentication request (i.e., to log in). An authentication or login is attempted when the user provides the server 150 with the passcode the user gets from the token 130. Accordingly, either the passcode is accepted or this passcode and additional subsequent passcodes are all being rejected, forcing the user to perform a certain action.

Overall, three cases of the s-FCA attack are considered:
(a) s-FCA-no-launch, where the token is not launched by the user before the attack time T'; no solution for either detection or prevention exists in this case;
(b) s-FCA-launch, where the token is launched at least once but there is no attempted login before the slack window corresponding to the attack time T'; no solution for prevention exists in this case; and
(c) s-FCA-login, where there is at least one attempted login before the slack window corresponding to the attack time T'.

Techniques for Defending Against Forward Clock Attacks
Detecting Forward Clock Attacks at the Token As noted above, when it comes to detection, the s-FCA-launch case is considered, where after an s-FCA attack is performed leaking passcodes up until time T, the clock is corrected and then the user launches the token in some time t.

An exemplary detection technique entails first storing at the token 130 as a special state the last time (epoch) D that the token 130 was used to produce a passcode. In conventional tokens, no such state information is stored or used; that is, the time D at which the token 130 was last used is not explicitly or implicitly stored in the state of the token 130. Then, the following test is performed when a new passcode $P_d$ is to be produced corresponding to current time (epoch) d:

Detection test: Is d<D?

A yes answer to this test corresponds to detecting an s-FCA attack. Clearly, according to the above analysis, this test can successfully detect that an s-FCA attack has been launched against the token 130. Note that an s-FCA attack does not involve the compromise of the token 130 (only temporary possession of the device 110); therefore, the attacker cannot forge the value D corresponding to the last epoch at which the token 130 was used.

It is noted that, by definition, the attack leaks passcodes that are outside the slack window s of the correct current time d, therefore the slack s does not need to be taken into consideration in the test. In cases where more relaxed versions of forward clock attacks are to be detected, the test can be extended to be sensitive to the slack window, i.e., Slack-Sensitive Detection test: Is d<D−s?

Again, a yes answer corresponds to a detection. Here, no detection is triggered if d is not more than s epochs before D, because in this case d and D are essentially equivalent epochs with respect to authentication decisions at the server 150. However, this extension has a possible disadvantage: If the token 130 gets compromised by an attacker, the attacker can learn the slack value s which may not be public information in the system.

Therefore, by recording appropriate time information in the state, when a user launches the token application and a new passcode is generated, the token 130 can successfully detect that an FCA has occurred (an improvement over currently existing conventional tokens). Conventional tokens do not mitigate the issues related to time de-synchronization and, although they have no usability problems (in particular, as no forward security is present, they suffer no BLOCK events), they provide no security against FCA attacks. For instance, an s-FCA can neither be prevented nor detected and an attacker can use any stolen passcode anytime within the slack window centered at the attack time D. The exemplary disclosed detection method offers an enhancement for detecting FCA attacks at the token 130, in a setting with or without forward security, which opens the possibilities for detection at the server side and even prevention.

Figure 6:
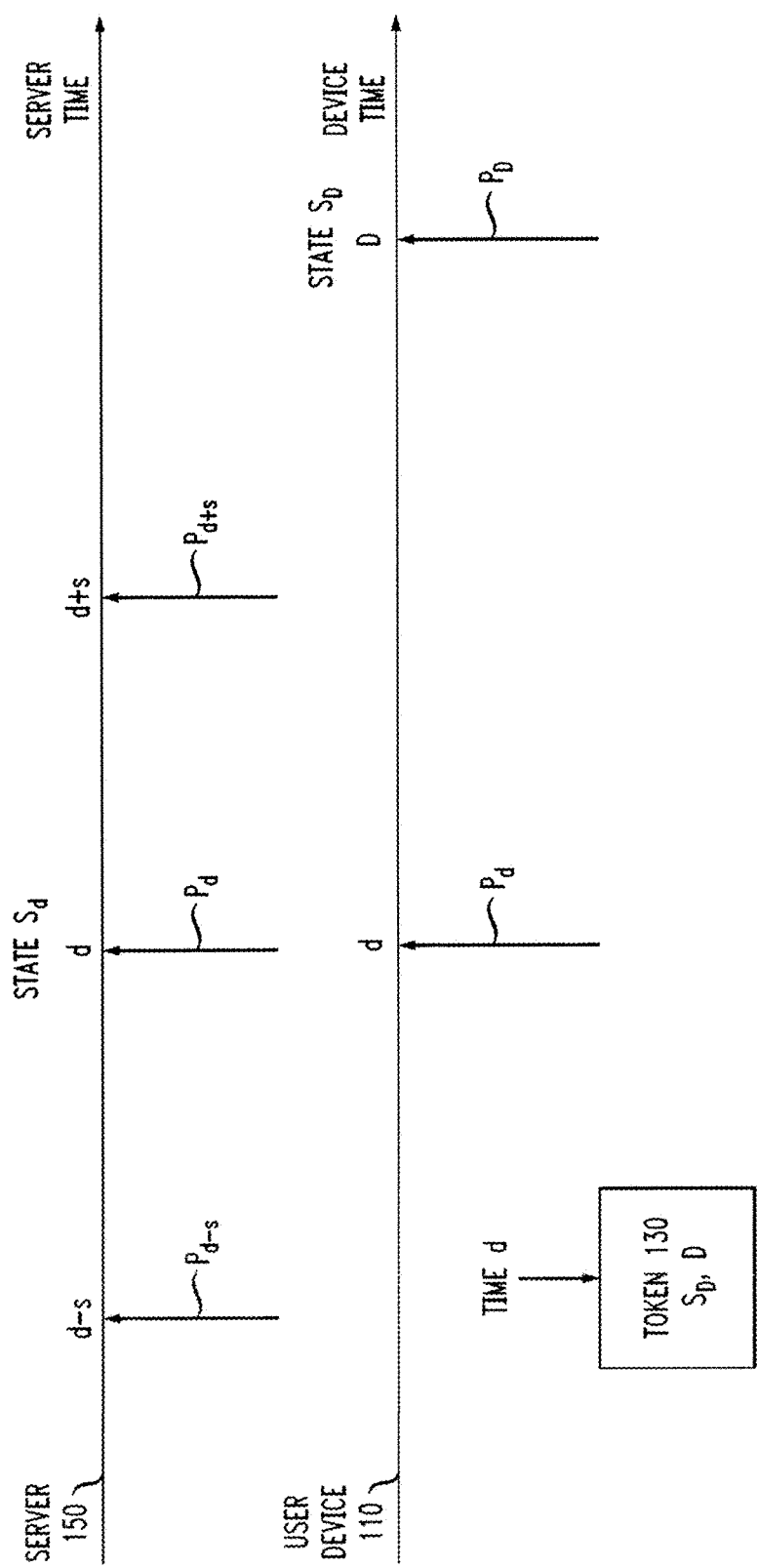
FIG. 6 illustrates detection of a forward clock attack at the token in accordance with aspects of the present invention.

FIG. 6 illustrates detection of an FCA at the token 130 in accordance with aspects of the present invention. As shown in FIG. 6, the user attempts to generate a passcode $P_d$ at a device time d using the token 130. The token 130 performs the detection test (Is d<D−s?), where D is the last epoch for which a passcode was produced by the token 130 and d is the correct token and server time. A yes answer corresponds to an FCA detection. Here, no detection is triggered if d is not more than s epochs before D, because in this case d and D are essentially equivalent epochs with respect to authentication decisions at the server 150.

It should be understood that under normal operation of the token, on every new passcode generation the token updates the last used device time to a current device time.

Consider the following extension in cases where the token 130 employs the use of silent alarms, referenced above, sent to the server 150 via an auxiliary channel, referenced above. In this case, a silent alarm can be triggered and securely (with respect to integrity and confidentiality) stored at the token 130. This alert message can take either the form of a one-time alert "FCA Alert" message or the form of a monotonic counter that counts how many FCA detections have been observed at the token 130. In either form, the message will be securely embedded in any passcode produced by the token 130 after the time the silent alarm was triggered. Therefore, the alert will be communicated successfully to the server 150 with the first successful authentication attempt by the user.

This extension then provides a very effective way to communicate to the server 150, in a best-effort manner, that an FCA attack was detected in the token 130. The server 150 will be notified only when the user succeeds to authenticate to the server, which may be much later than the time T' when the attacker attempts an impersonation attack against the user. This notification sent to the server 150 of an FCA detection at the token 130, however, is very important in the cases where: (1) an FCA attack is launched; (2) the user later in time less than T' launches the token 130 but either does not attempt authentication or it quits trying to authenticate (due to blocking, as discussed below); (3) the attacker possibly performs an impersonation attack in time T'; (4) the user authenticates successfully at a time later than T when the attack window of the FCA attack ends (this is possible because the token 130 will be unblocked by that time).

Without the extension to trigger a silent alarm for the FCA detection, the server 150 would never be notified about this suspicious event (detected using as test d<D or d<D−s or d<D−t for t<s) and the possible impersonation would go unnoticed. Instead, with the silent alarm extension the server will be eventually notified and perform forensics to identify the exact attack that possibly happened.

Unblocking of Token and Blocking of Attacker

A "next-passcode rule" is a method for handling time desynchronization issues at the token 130, so that (1) the token 130 maintains its operation and (2) the forward clock attacker may be blocked and not be able to perform a future impersonation attack.

The next-passcode rule enforces a certain passcode-generation policy in tokens that employ forward security. As explained above, forward-secure tokens have the unique property that the secret state evolves over time but this evolution is unidirectional: older states can produce more recent states, but recent states cannot produce older states. Therefore, whenever the token suffers an FCA attack, it is the case that its state has been advanced to epoch D, but the token is launched to compute a passcode that corresponds to state of epoch d with d<D (where without loss of generality, D−d>s, with s defining the slack window). In this case, a BLOCK event occurs, where the token cannot compute any passcode according to the standard passcode-generation protocol that takes as input the current time d, which is expected to be match or succeed the last recorded state D, and attempts to advance the token's state D to d to produce the new passcode $P_d$. Note that this protocol will be blocked (will not be able to execute) if d<D.

Figure 7:
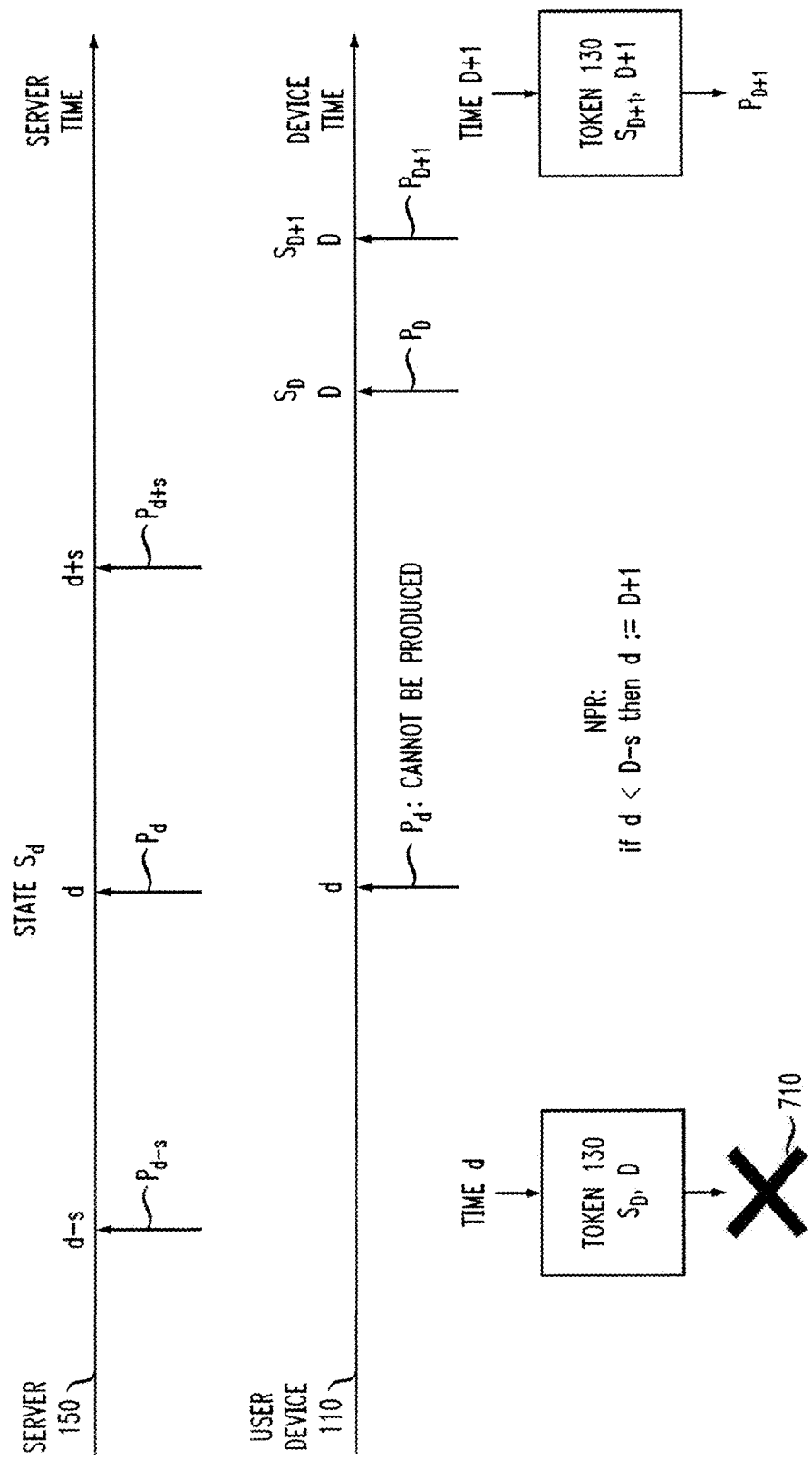
FIG. 7 illustrates a next-passcode rule (NPR) that incorporates aspects of the present invention.

FIG. 7 illustrates the next-passcode rule (NPR) that incorporates aspects of the present invention. As shown in FIG. 7, whenever the standard token-generation protocol cannot be executed because d<D (as shown by label 710), the following correction step is performed in accordance with the NPR to unblock the token-generation protocol. The current epoch d is set to D+1, so that what is produced at device time D+1 is the next passcode that can possibly be produced. In essence, the NPR rule states that the forward-secure one-way chain of secret states is traversed all the way to reach epoch D+1, the immediate next state of the state at which the token was forwarded by the attacker. Overall, the NPR rule enforces the token 130 to use the next producible passcode whenever the current time does not allow for the "correct" passcode generation.

The NPR rule facilitates prevention of FCA attacks. It is noted that since D+1 is far in the future, many successive authentication attempts made by the user (recall that, an s-FCA-login case is needed in order to possibly prevent FCA attacks) by providing passcodes produced by the token 130 will be rejected by the server 150. Although the server 150 cannot distinguish between this case and normal unsuccessful authentication attempts by the user (e.g., due to mistyping or clock drifting beyond the slack window, etc.), this is a noticeable event for the user. Therefore, a mindful user will then be forced to proceed with a certain action in accordance with aspects of the present invention, discussed below. This action takes the form of directly or indirectly communicating to the server about the token-side FCA detection so that the server is notified about the attack and further usage of any leaked passcode for epoch d'<D+1 is directly or indirectly prevented.

Finally, the next-passcode rule is useful also for a more natural case where the condition d<D may arise. In applications where a fresh new passcode is to be produced every time the token is launched, whenever a user launches the token 130 many times within the same epoch, the token 130 would normally suffer a similar BLOCK event, since in this case the token cannot produce a fresh token more than once. Using the next-passcode rule this problem is eliminated. However, in this case the test d<D for detecting FCA attacks may introduce false positives, therefore the test should be relaxed to d<D−t where t is a small integer less than the slack s, e.g., t=20 epochs (minutes) when s=70 epochs (minutes). Note that in applications where it is not necessary to produce fresh new passcodes when the user launches the token many times within the same epoch, the next passcode rule is not necessary: caching in the token 130 the most recent passcode produced when the token application ends would provide a robust solution to the problem of repeated launching of the token application within the same epoch.

Detection and Prevention of Forward Clock Attacks

Aspects of the present invention provide techniques for token-side detection of FCA attacks, as well as (server-side) detection and prevention of such attacks in the forward-secure operational setting for tokens. That is, tokens are considered with state that evolves over time in a forward-secure manner. The exemplary techniques make use of properties related to forward-secure tokens for providing a better solution against FCA attacks. In other words, using forward security extensions of tokens, an exemplary token-side detection method can be strengthened to give server-side detection and prevention methods.

According to one aspect of the invention, an FCA attack that has been detected is communicated to the server while ensuring that FCA prevention is enforced. The following general design pattern is employed in an exemplary embodiment:

1. Forward security: The state of the token 130 evolves in a forward-secure manner.

2. Token-side detection: The token-side detection policy (described above) is in place and a possible FCA attack is detected once the token 130 is launched (s-FCA-launch).

3. Next-Passcode Rule: The token-side policy (described above) regarding passcode generation is in place at the token 130 to facilitate prevention.

4. Communication: The (token-side) detection is (directly or indirectly) communicated to the server once an authentication is attempted (s-FCA-login).

5. Reaction: The server 150 possibly reacts to this notification with a corresponding follow-up action.

In short, item 1 above provides the general operational setting; item 2 initiates the detection at the token; item 3 enables the prevention at the server; item 4 propagates the detection to the server; and item 5 corresponds to the server-side reaction to this detection propagation.

According to further aspects of the invention, discussed hereinafter, two exemplary secure (against s-FCA attacks) protocols are characterized by different implementations of items 4 and 5 above, or the overall protocol operation, and, in turn, by different achieved usability properties.

Block then Call Scheme

A first exemplary scheme, called BLOCKthenCALL, follows the general design framework described above where the communication step comprises a direct notification by the user to the server about the BLOCK event that has been experienced by the user. Then, the BLOCKthen-CALL scheme comprises the following policies being in place:

1. Forward Security: The state of the token 130 evolves in a forward-secure manner.

2. Token-Side Detection: The token-side detection policy is in place and a possible FCA attack is detected once the token 130 is launched.

3. Next-Passcode Rule: The next-passcode rule policy regarding passcode generation is in place at the token 130.

4. Direct BLOCK Notification Action: The token-side detection of a BLOCK event is directly communicated to the server 150 by the user once at least one authentication is attempted and failed by the user. In particular, the user is instructed and trained to perform a direct BLOCK notification action when a BLOCK event is experienced by the user through one or more successive failed authentication attempts.

5. Reaction: After the user's direct notification action, the server 150 is notified about the BLOCK event and accordingly proactively inactivates the token 130 to prevent a possible FCA attack. Additionally, the server investigates this BLOCK event to detect whether an FCA attack was indeed launched.

The device 110, the token 130 and the server 150 can each be implemented, for example, in the manner discussed above in conjunction with FIG. 2. The user then just needs a telephone or another communication mechanism, such as a telephone call, electronic mail, text message or instant message, to notify the server 150 of the BLOCK event.

The direct BLOCK notification action by the user refers to any possible way with which the user can communicate to the server about the BLOCK event. For instance, it can take one of the following forms of notification:

The user places a service call to the information technology (IT) office and talks to an IT person;

The user fills in and submits a brief web form over the Internet that is processed by the server 150; the form is sent over secure communication and may include a user's PIN for some weak form of user authentication.

A more aggressive direct BLOCK notification action can be implemented by extending the user interface of the token 130 to present an alerting diagnostic message, such as a pop up message, (e.g., "Call your administrator, Alert Code 1") anytime an FCA attack is detected (using the tests described above).

After an FCA attack, at the first token launch it holds that d<D and the new passcode rule will produce a passcode for D+1. Then, when this passcode (or any successor passcode) will be provided to the server 150, this passcode will be rejected and a BLOCK event will be noticed by the user. Then, a notification action by the user (e.g., a service call) will be performed which results in a proactive blocking of the token 130, thus also of the attacker—this corresponds to a prevention of the attack. However, since a BLOCK event can be triggered also by other factors, e.g., a mistyping of a passcode by the user, and not necessarily by an FCA attack, the server 150 can perform additional server-side forensics that can allow the detection of an actual attempted attack.

The sensitivity by which a BLOCK event is interpreted by a user, that is, after how many unsuccessful authentication attempts the user performs, the BLOCK notification action is a parameter that can vary: it depends on the user and the recommendation or instruction given to the user during training, but it is expected to be a small integer value, e.g., 1, 2 or 3.

Overall, the exemplary BLOCKthenCALL scheme is secure according to the definition provided above. In terms of usability, the scheme: (1) blocks the token 130 in the case of a notified BLOCK event; and (2) relies on the out-of-band communication by the user to the server 150.

Button Press Scheme

A second exemplary scheme, called ButtonPress, follows the general design framework described above, where now the communication step comprises an indirect notification by the user to the server about the BLOCK event that has been experienced by the user.

Figure 8:
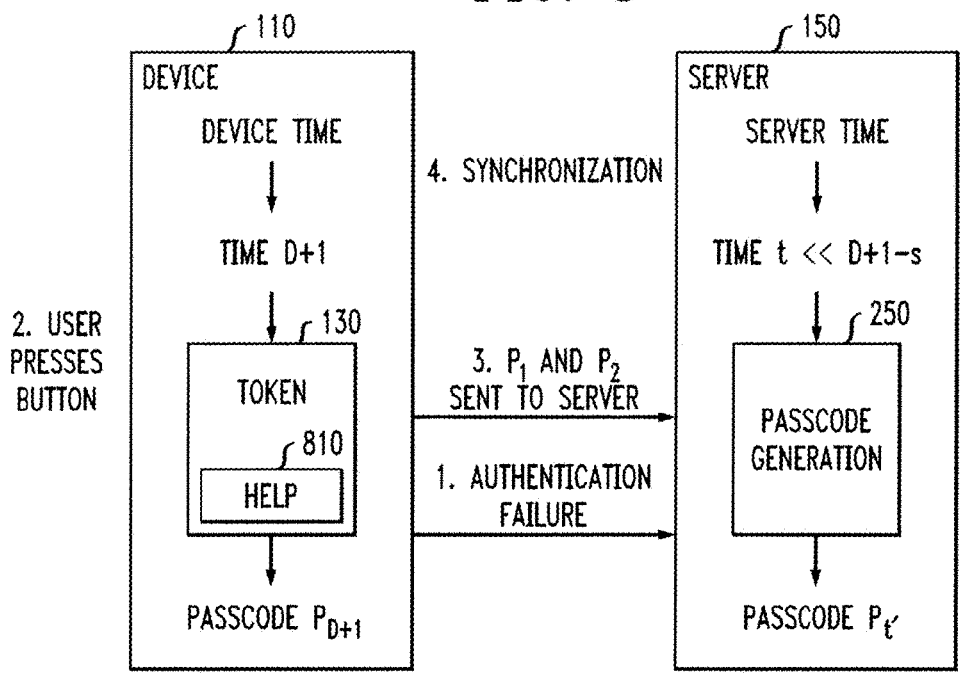
FIG. 8 illustrates a user device attempting to authenticate to a server in accordance with a button press implementation of the present invention.

FIG. 8 illustrates a user device 110 attempting to authenticate to a server 150 in accordance with a button press implementation of the present invention. As indicated above, the server 150 must authenticate a user who provides a candidate passcode P' by first recomputing the passcode $P_t$ using a passcode generation block 250 that corresponds to the current time t (at the epoch level) that the server 150 knows, and then accepting the submitted passcode if and only if $P'=P_t$.

As shown in FIG. 8, the indirect notification of the Button Press scheme is based on the pressing of simple "rescue" button 810 that the token application 130 is now equipped with; then the token 130 is communicating synchronization information to the server 150 by means of regular passcodes. That is, the actual BLOCK event and, in fact, a special "synch" message are communicated to the server 150 without user knowledge.

In particular, the second exemplary scheme comprises the following policies being in place:

1. Forward Security: The state of token 130 evolves in a forward-secure manner.

2. Token-Side Detection: The token-side detection policy is in place and a possible FCA attack is detected once the token 130 is launched.

3. Next-Passcode Rule: The next-passcode rule policy regarding passcode generation is in place at the token 130.

4. Indirect BLOCK Notification Action: The token-side detection of a BLOCK event is indirectly communicated to the server 150 by the user pressing a button 810 (Step 2) once at least one authentication is attempted and failed by the user (detected during Step 1). In particular, the user is instructed and trained to perform a indirect BLOCK notification action (button press) when a BLOCK event is experienced by the user through one or more successive failed authentication attempts. This action, though, entails a low-level special token functionality that communicates to the server 150 some special time-synchronization information but without changing the user experience (other than the pressing of the button).

5. Reaction: After the user's indirect notification action, the server 150 is notified about the BLOCK event and is also provided by time-synchronization information. Accordingly, the server 150 performs a reactive action to prevent a possible FCA attack without inactivating the token 130. Additionally, the server 150 investigates this BLOCK event to detect whether an FCA attack was indeed launched.

The indirect notification action by the user, the special functionality by the token and the reaction by the server are discussed below:

1. User Action:
  (a) The user interface of the token 130 is augmented so that a special "rescue" or "help" button 810 appears on the screen of the device 110 when the token application 130 runs on the device 110.
  (b) The user is instructed and trained to press button 810 if a BLOCK event is detected due to one or more successive failed authentication attempts (Step 1).
  (c) When the button is pressed (Step 2), the user is presented with 2 passcodes, $P_1$ and $P_2$.
  (d) Passcodes $P_1$ and $P_2$, discussed below, are consecutively provided by the user in a new authentication attempt (Step 3). The user knows that these two passcodes must be provided in a new authentication attempt either because the user has been instructed to do so after pressing the button 810 or by being reminded to do so through a special diagnostic message of the form "Please provide passcodes:" that will appear together with the two passcodes.

2. Token Functionality:

The two passcodes $P_1$ and $P_2$ produced by the token 130 when the button 810 is pressed are defined as follows.

(a) The second produced passcode $P_2$ is the current passcode generated by the token 130 corresponding to the epoch when the button 810 was pressed. Note that $P_2$ may be produced after the next-passcode rule has been applied. In particular, after an FCA attack, at the first token launch it holds that d<D and the new passcode rule will produce passcodes for epochs D+k, k≥1; therefore, $P_2$ may be of the form $P_{D+k}$ for some k≥1. In general, $P_2$ corresponds to epoch $D_2$.

(b) Then, the first produced passcode $P_1$ is a special fake passcode that encodes the epoch $D_2$ that passcode $P_2$ corresponds to. A special encoding is used for $P_1$ so that the server 150 can distinguish that this received passcode is a special fake one that encodes an epoch (the epoch of a second passcode). For instance, $P_1$ may have an additional digit at the end, set to a pre-specified value, e.g., 0.

3. Server Reaction:

(a) When the server 150 receives a passcode $P_1$, the server 150 first checks to see if this is a special fake passcode. If not, the server 150 operates normally. Otherwise, the server 150 performs two new main steps:

i. The server 150 reads this information as epoch D, and updates its state to correspond to this new epoch D. This synchronization event (Step 4) means that the server 150 either advances its state either forward or backward to a new state corresponding to epoch D and that the correct current time of the server is mapped to this new state of epoch D. Note that in the case where the state must advance backward, the server 150 can still do so (even if this is against the forward security), because the server 150 can keep the master seed of the token 130 (i.e., a state that corresponds to first epoch at the very beginning of the tokens lifetime).

ii. At the same time, the server 150 sends a special "re-synch" signal to the higher web application to ask the user for another passcode.

(b) After this correction step, the server 150 processes passcodes as usual; if passcode $P_2$ is then received that is not a special fake one, the server 150 will attempt to verify this using its current epoch D.

After an FCA attack, at the first token launch, it holds that d<D and the new passcode rule will produce a passcode for D+1. Then, when this passcode (or any successor passcode) will be provided to the server 150, this passcode will be rejected and a BLOCK event will be noticed by the user. Then, the indirect notification action by the user (through the pressing of the rescue/help button 810) will be performed which results in an on-demand resynchronization of the token 130 with the server 150, for instance, on epoch D+1, and also in blocking the attacker. It should be understood that by resynchronization, it is meant that the current server clock does not change itself but it is updated to map to the new secret state of the token that corresponds to new epoch D+1. That is, in essence, the server-side current index pointing to current state in the infinite forward-secure series of token states is shifted some positions forward (or backwards) to the correct position that matches the current state of the token. This corresponds to solving the desynchronization problem and the prevention of the attack. However, since a BLOCK event can be triggered also by other factors, e.g., continuous mistyping of a passcode by the user, and not necessarily by an FCA attack, the server 150 can perform additional server-side forensics that can allow the detection of an actual attempted attack. Towards this goal, the server 150 can, for instance, inspect how much discrepancy exists between its local epoch D' and the new epoch D+1 that it receives encoded in the special fake passcode: The larger the difference, the more likely it is that a forward clock attack had been launched.

Again, the sensitivity by which a BLOCK event is interpreted by a user will vary but is generally expected to be a small integer value, e.g., 1, 2 or 3.

Overall, the exemplary ButtonPress scheme is secure according to the security definition provided above. In terms of its usability, the scheme: (1) does not block the token 130 in the case of a notified BLOCK event, (2) does not rely on the users out-of-band communication to the server 150, but it (3) requires a special user interface (UI) with button 810 and a special user training on how to use this UI.

In a strong forward clock attack, the attacker is assumed to harvest a series $P=\{P_{d_1}, P_{d_2}, \ldots, P_{d_t}\}$ of passcodes, where $d_1, d_2, \ldots, d_t$ are epochs that are spaced by T hours, (e.g., 1 hour or any fixed time period) apart. Of course, there is a trade-off between t and T: the attacker must complete the harvesting attack quickly, so the attacker cannot afford harvesting a very large number of passcodes. Thus, t must be upper bounded. Given this bound, the shorter the value T becomes, the shorter the total attack window that the attacker gets through the leaked passcodes in P. For instance, if T=1h then the attack window spans t hours, where the attacker has the opportunity to fake an impersonation only every hour within this attack window. If the attacker wants to have more flexible attack opportunities, e.g., to be able to impersonate a person every 10 minutes, the total attack window must be reduced to 10t minutes.

However, the exemplary ButtonPress scheme opens up the possibility that the attacker extends its attack window in an arbitrary way while spending the same amount of time during the attack. Consider the following attack strategy. The attacker chooses a large value of T, e.g., one day or week, and harvests t total passcodes spaced T time units apart. Then, the attacker is able to launch its impersonation attack at any point in time in this large attack window that spans tT total time, where T is arbitrarily large, by itself using the button pressing synchronization technique to fake the synchronization functionality of the token 130. Indeed, the attacker can forge the special fake passcode that encodes the new synchronization epoch D+1 in the discussion above to be equal to any index value $d_i$ in the series of harvested passcodes P, and then provide the server with $P_1=d_i$ as the first passcode and $P_2=P_{d_i}$ as the second passcode. Note that the next passcode rule of the token 130 does not help here as the token 130 is not involved in this impersonation attack.

To tolerate this type of even stronger attack, where the button pressing technique is used by the attacker to impersonate the user at any point in time by forging the synchronization process, the exemplary ButtonPress scheme is extended so that the process is also authenticated using the token's secret state. In particular, the first passcode $P_1$ that encodes the new epoch D+1 is changed to also include a type of a message authentication code (MAC) that depends on the new secret state of the token 130 corresponding to time D+1. For instance, $P_1=\text{Dec}(h(s_{D+1})\|D+1)\|0$, where Dec is a 6 or 8-digit decimal conversion function, h is a small-range hash function, $s_{D+1}$ is the secret state of the token 130 at time D+1, and 0 is the additional digit to identify the special encoding. Observe that with this extension, the special attack above cannot be performed by an attacker that does not have access to the token's internal secret state.

Alternatively, to strengthen the security of the hash function above, the scheme can be extended so that a large-range hash function h is used, the first passcode $P_1$ is as in the basic ButtonPress scheme, i.e., $P_1=\text{Dec}(D+1)\|0$, and a third passcode $P_3=Dec(h(s_{D+1}))$ is produced by a token in the "pressed button mode" and provided to the server 150 by the user.

Time Hint Scheme

The Time Hint scheme follows the general design pattern described above for the Button Press scheme, where an indirect BLOCK event notification is communicated from the token 130 to the server 150. However, instead of using a user-triggered technique (such as pressing a button 810 on the token 130) to initiate a synchronization process through the user, the Time Hint scheme makes use of a more indirect communication channel to transmit useful information that would allow the server 150 to synchronize with the token 130 to the new epoch D+1.

Generally, time hints are permanently or on-demand embedded into the passcode itself.

Permanent Time Hints

Figure 9:
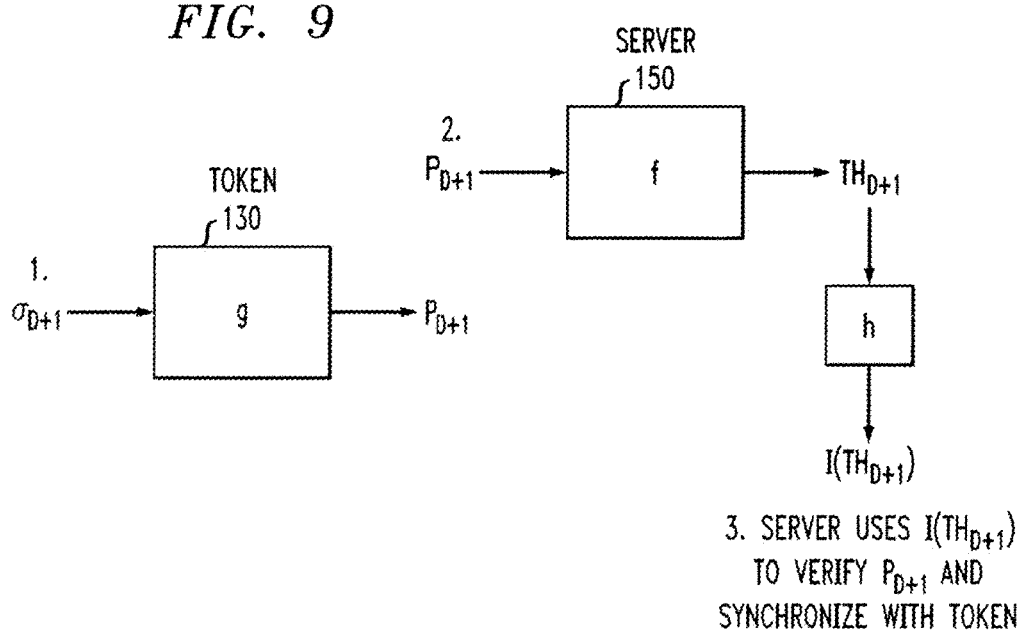
FIGS. 9 and 10 illustrate permanent time hints in accordance with an aspect of the present invention.

FIG. 9 illustrates permanent time hints in accordance with an aspect of the present invention. As shown in FIG. 9, under the Time Hint scheme, the token 130 generates a passcode $P_{D+1}$ during step 1 that embeds a time hint, using a passcode generation function g. The server 150 then inspects the presented passcode $P_{D+1}$ during step 2 and uses the embedded time hint whenever the passcode is not initially accepted by the server 150. In this case, whenever the server 150 has a local state corresponding to current time t and attempts to verify a received passcode $P_{D+1}$ of time D+1 that falls outside the server's s-slack window centered at time t, the search space of the server 150 for the received passcode $P_{D+1}$ is an infinite window.

As discussed further below in conjunction with FIG. 12, to reduce this search space, the server 150 can employ the time hint embedded in $P_{D+1}$ by applying a function $f$ on $P_{D+1}$ to get some time-related information $TH_{D+1}=f(P_{D+1})$ where, similarly, the token 130 embeds this time to the passcode through the function g as $P_{D+1}=g(\sigma_{D+1})$, where $\sigma_{D+1}$ is the secret state of the token at time D+1. Then, $TH_{D+1}$ itself uniquely defines, through another function h, a finite search interval $I(TH_{D+1})$ so that it is guaranteed that $D+1 \in I(TH_{D+1})$. The server 150 uses $I(TH_{D+1})$ during step 3 to verify $P_{D+1}$ and synchronize with the token 130. Therefore the new search space for the server 150 is reduced from an infinite search space to a finite value $|I(TH_{D+1})|$; i.e., the smaller the length of this interval, the smaller the search space for the server 150. For instance, $I(TH_{D+1})$ may be of the form $TH_{D+1}=[t_L,t_R]$ when, e.g., $I(TH_{D+1})$ encodes the most significant bits of value D+1. In some cases, $I(TH_{D+1})$ may be of size 1, when, e.g., $I(TH_{D+1})=D+1$.

Embedding the time hint into the passcode through function g can be done in many ways by trading-off some security of the unpredictability of the produced passcodes or some bandwidth. For instance, the last digit of the passcode can be replaced with a digit that corresponds to the time hint or an additional digit is added to the passcode that is to interpreted as the time hint.

Permanent Time Hints with Key Protection

Figure 10:
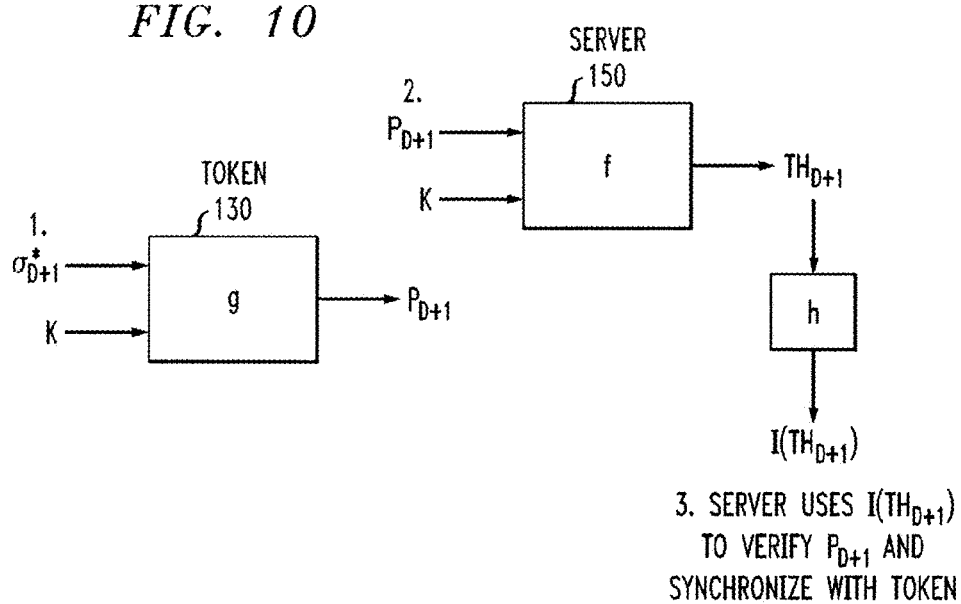

FIG. 10 illustrates permanent time hints in accordance with a further variation of the present invention. To protect the learning of the time hint by an external attacker that observes the transmitted passcode over a communication network, a secret key can be used in the encoding (embedding) of the time hint by the token 130 through function g and respectively the decoding of the time hint by the server 150 through function $f$. For instance, as shown in FIG. 10, functions $g,f$ in this case can take as input an additional secret key $\kappa$ shared by the token and the server, i.e., $P_{D+1}=g(\sigma_{D+1},\kappa)$ and $TH_{D+1}=f(P_{D+1},\kappa)$. Key $\kappa$ may evolve over time in a forward-secure way of low update rate (so that time synchronization issues with respect to $\kappa$ are avoided).

On-Demand Time Hints

On-demand time hints are embedded in the passcode only occasionally, e.g., only when the token 130 determines that embedding the time hint is useful or necessary (e.g., in the case where an FCA has locally been detected by the token 130). To selectively notify the server 150 whether a time hint has been used in the passcode received by the server 150, the On-Demand Time Hint solution assumes the use of a low-bandwidth auxiliary channel between the token and the server. In particular, some portion of the bandwidth of this auxiliary channel is employed to directly or indirectly encode the time hint.

Figure 11A:
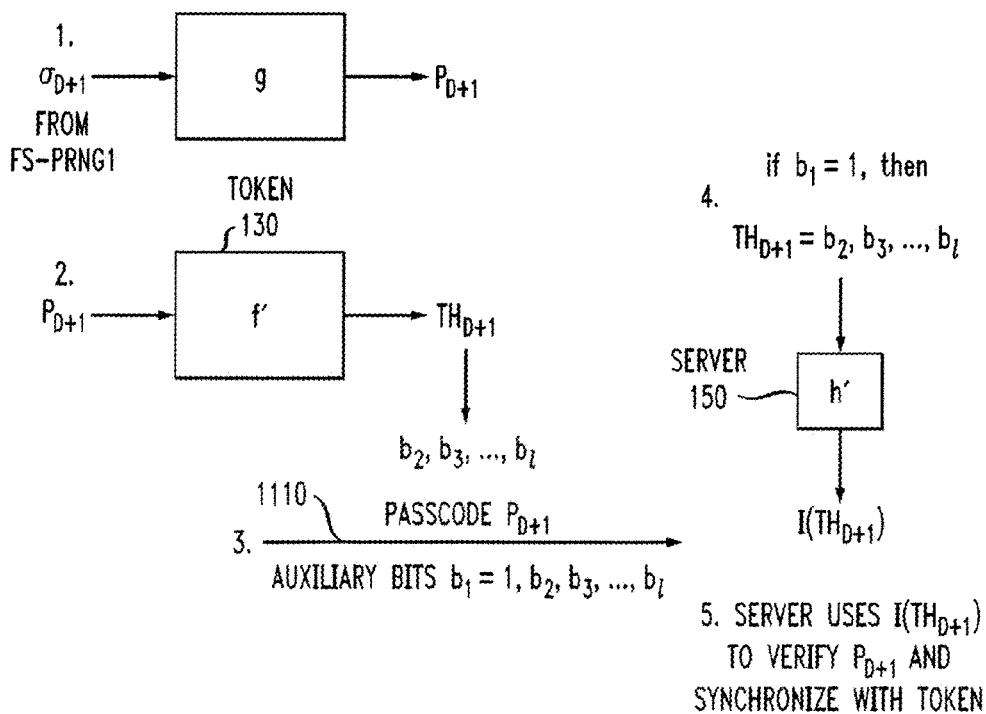
FIGS. 11A-C illustrate on-demand time hints in accordance with further aspects of the present invention.

FIG. 11A illustrates on-demand time hints in accordance with a further aspect of the present invention using a verification-independent auxiliary channel. For instance, if l bits $b_1,b_2,\ldots,b_l$ are supported by an auxiliary channel 1110, then one bit $b_1$ can be used as a time-hint flag to denote the activation of the time-hint option by the token 130. In this case, whenever a time hint is used by the token 130, this bit $b_1$ is set to 1 and $b_2,\ldots,b_l$ are set to encode the time-related information $TH_{D+1}=f'(P_{D+1})$ according to a function $f'$. When the server 150 receives a passcode $P_{D+1}$ and corresponding auxiliary bits $b_1,b_2,\ldots,b_l$ where $b_1=1$, the server 150 interprets the remaining k-1 auxiliary bits as the time hint $TH_{D+1}$ embedded in the received passcode $P_{D+1}$. That is, the server 150 employs a function h' that maps these bits $b_2,\ldots,b_l$ received by the auxiliary channel 1110 to a finite search interval $I(TH_{D+1})$ so that it is guaranteed that $D+1 \in I(TH_{D+1})$ Whenever $b_1=0$, the remaining auxiliary bits can be used for any other purpose.

The above solution relies on the existense of an auxiliary channel that embeds in the transmitted passcode $P_{D+1}$ some information (a number of bits) that specify an interval $I(TH_{D+1})$ so that $D+1 \in I(TH_{D+1})$ or the exact time D+1 that the transmitted passcode corresponds to. This assumes that the auxiliary channel communicates the bits that are embedded into the passcode independently of the status of the server-side passcode verification, that is, unconditionally on whether the passcode $P_{D+1}$ is verified and thus accepted by the server 150. This is particularly useful in the above solution, as the time hint must be received by the server 150 in order for the passcode $P_{D+1}$ to be verified. These auxiliary channels are referred to as verification-independent auxiliary channels.

However, for some auxiliary channels, this property may not hold true. For instance, the low-bandwidth auxiliary channel referenced above (U.S. patent application Ser. No. 13/249,957, filed Sep. 30, 2011, entitled "Methods and Apparatus for Secure and Reliable Transmission of Messages Over a Silent Alarm Channel," now U.S. Pat. No. 8,788,817) is conditioned on passcode verification, that is, the channel is able to communicate the auxiliary information to the server 150, and therefore the time hint $TH_{D+1}$ in the above solution, only when the passcode $P_{D+1}$ is verified by the server 150. These auxiliary channels are referred to as verification-dependent auxiliary channels. Such verification-dependent auxiliary channels are clearly problematic to be used in this case, since on the one hand, the time hint is needed by the server 150 in order to verify the passcode but on the other hand, due to the precondition on the functionality of the auxiliary channel, the passcode must be verified in order for the server 150 to be able to read the time hint. In order words, verification-dependent auxiliary channels are not appropriate for communicating time hints to realize the disclosed solution based on on-demand time hints.

Figure 11B:
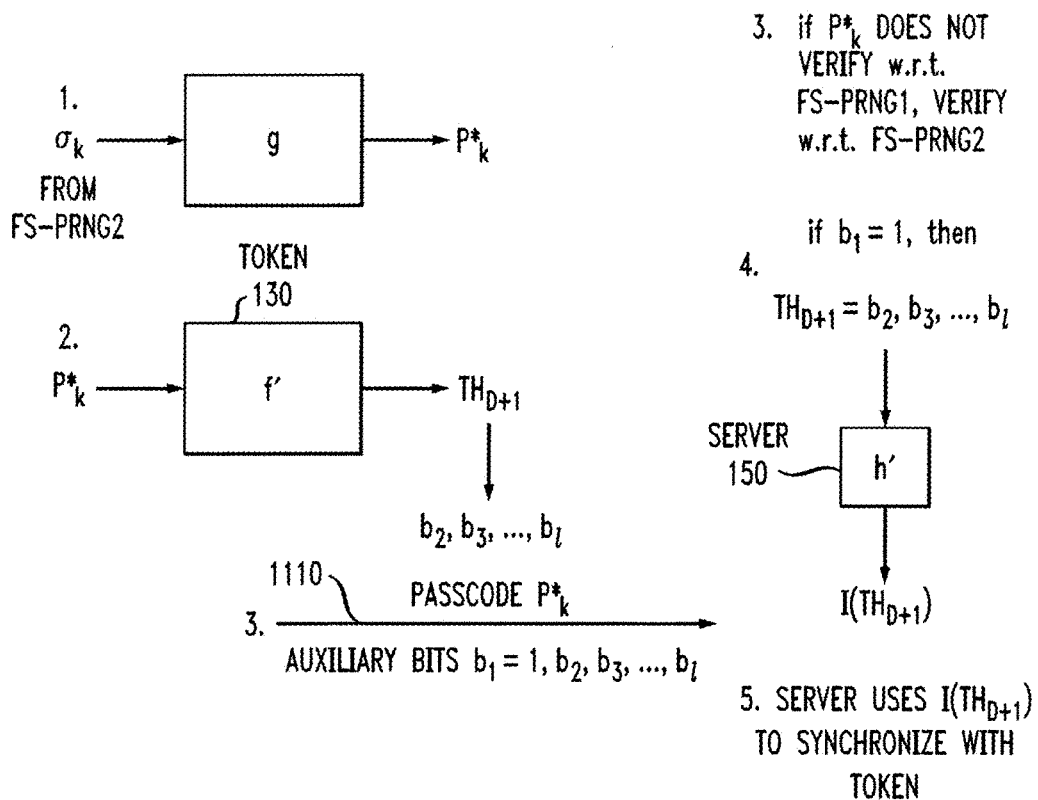

Consider the following extension to the basic on-demand time-hint scheme that provides a solution to the above problem by allowing to employ on-demand time hints also through verification-dependent auxiliary channels. This extension works as follows. FIG. 11B illustrates on-demand time hints in accordance with this further extension of the present invention using a verification-dependent auxiliary channel.

1. In addition to the main forward-secure pseudorandom number generator, denoted by FS-PRNG-1, that produces forward secure secret states, namely seeds, which in turn are used to produce the passcodes, the token 130 uses a separate, independent forward-secure pseudorandom number generator, denoted by FS-PRNG-2. Unlike FS-PRNG-1 which generates seeds on a predetermined schedule (in particular, one seed every time epoch T, e.g., every one minute) in a hierachical manner (e.g., using a FS-PRNG tree as in U.S. patent application Ser. No. 13/334,709, filed Dec. 23, 2011, entitled "Methods and Apparatus for Generating Forward Secure Pseudorandom Numbers," now U.S. Pat. No. 9,008,303, incorporated by reference herein) that allows efficient catch-up operations for producing seeds in arbitrarily long forward positions, FS-PRNG-2 generates seeds using an on-demand schedule where a new seed is produced whenever the token needs one such seed from FS-PRNG-2. FS-PRNG2 need not necessarily use any hierarchical manner to produce seeds, for instance, FS-PRNG2 may simply be a one-way hash chain.

2. Whenever the token 130 determines that embedding the time hint is useful or necessary (e.g., in the case where an FCA has locally been detected by the token 130), the token 130 embeds a time hint about the current epoch D+1 of FS-PRNG1 using a verification-dependent auxiliary channel 1110 as described above, but in this case by employing as secret state $\sigma^*_k$ a seed that is produced by FS-PRNG2 rather than FS-PRNG1 (Steps 1 and 2). That is, the series of seeds $\sigma^*_k$ produced by FS-PRNG2 correspond to a set of "emergency" or "time-synchronization" seeds that are used to produce passcodes $P^*_1, P^*_2, P^*_3, \ldots$ that embed time-hints about FS-PRNG1.

3. On receiving a passcode $P_{D+1}$, the server 150 first attempts to verify this passcode using the seeds from FS-PRNG1, but if the verification step fails at step 3 due to desynchronization between the server 150 and the token 130 where epoch D+1 is not in the search space of the server 150 (i.e., for all seeds that correspond to a slack window of some predetermined length no verification is achieved), instead of rejecting the passcode, the server 150 next attempts to verify passcode $P_{D+1}$ using one or more seeds from FS-PRNG2. That is, the server 150 attempts to interpret $P_{D+1}$ as a passcode $P^*_k$, k>0, that is produced through an "emergency" seed generated by FS-PRNG2. If any of these examined seeds results in the verification of passcode $P_{D+1}$, then the server 150 uses the embedded time hint $TH_{D+1}$ during steps 4 and 5 to update its search space with respect to FS-PRNG1. That is, the time hint $TH_{D+1}$ specifies an interval $I(TH_{D+1})$ so that $D+1 \in I(TH_{D+1})$ or the exact epoch D+1 that the token's FS-PRNG1 currently corresponds to. If $P^*_k$ does not verify the server 150 rejects the passcode.

4. At the same time, the server 150 sends a special "re-synch" signal to the higher web application to ask the user for another passcode. The token 130 then will provide a passcode $P_{D+2}$ that is produced using FS-PRNG1, and $P_{D+2}$ will then be verified by the server 150 using the new state (of the server 150) that has been updated by $I(TH_{D+1})$ to correspond to epoch D+1.

Therefore, in the above scheme extension, the second forward-secure pseudorandom number generator FS-PRNG2 serves as an "emergency" generator that produces seeds for the purpose of producing passcodes only when the token 130 needs to transmit a time hint to the server with respect to FS-PRNG1, for instance, in cases where it is determined by the token 130 that the token 130 and the server 150 are not synchronized with respect to FS-PRNG1. Note that the token 130 and the server 150 will be closely synchronized with respect to FS-PRNG2, because this generator is not time-based but rather event based, and therefore, for instance, it is not successible to forward clock attacks, which is a common cause for desynchronization between the token 130 and the server 150. In particular, FS-PRNG2 evolves over time with very low update rate: new seeds are produced only when the token 130 determines that a time hint must be embedded to the passcode and sent to the server 150, but this only happens on demand, therefore not that often. Therefore, it is expected that the token 130 and the server 150 will always be in synch with respect to the state of FS-PRNG2.

However, for the unlikely event where there is some small descrepancy between the state of the token 130 and the server 150 with respect to FS-PRNG-2 (e.g., because the token produces one or few "emergency" passcodes that embed a time hint but these passcodes are either not sent to the server or are mistyped) the present extension can simply allow for some slack window at the server: In step 3 of FIG. 11B, the server 150 is extended to attempt to verify the passcode $P^*_k$ by checking d, instead of one, consecutive seeds of FS-PRNG2. That is, the server 150 is extended to make use of a slack window of length d with respect to FS-PRNG2.

Figure 11C:
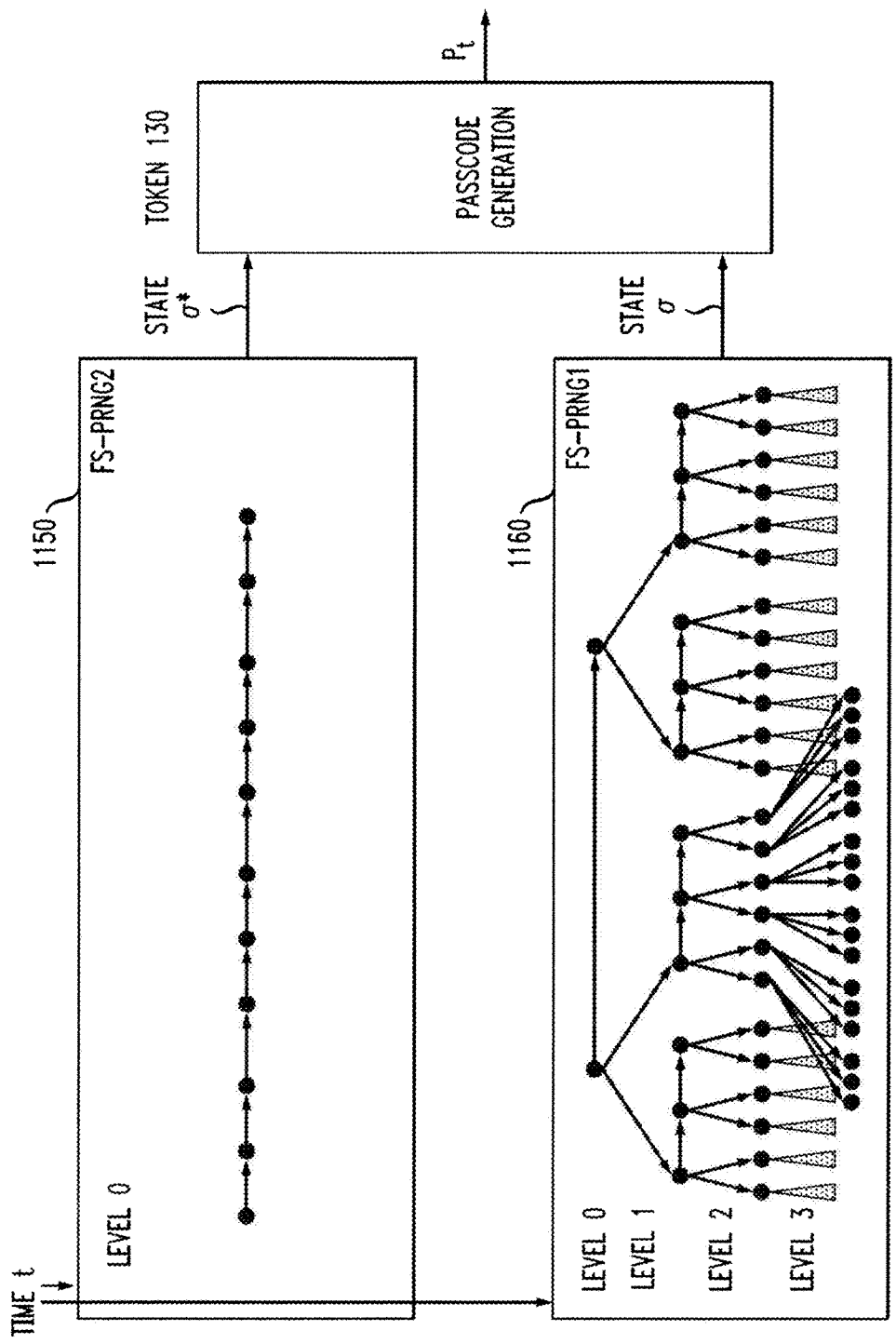

FIG. 11C illustrates the use of two forward-secure pseudorandom generators (FS-PRNG1 and FS-PRNG2) in accordance with the embodiment of the present invention shown in FIG. 11B. In the exemplary embodiment, FS-PRNG2 is an event-based generator (i.e., on demand, where, e.g., new seeds are produced only when the token 130 determines that a time hint must be embedded to the passcode and sent to the server 150) or otherwise evolves over time with very low update rate (e.g., a new seed is produced each month). For example, FS-PRNG2 can implement a one-way hash function 1150 to produce the emergency synch seeds $\sigma^*_k$. FS-PRNG2 is only used when a time-hint is needed. Otherwise, FS-PRNG-1 is used to generate regular high rate seeds $\sigma_k$ using FS-PRNG tree 1160. The token 130 generates a passcode $P_t$ based on the presented seed from FS-PRNG1 or FS-PRNG2.

Moreover, alternatively, strong synchronization can be ensured between the token 130 and server 150 with respect to FS-PRNG2 by having this evolving over time with a very low rate. That is, FS-PRNG2 produces a time-based series of seeds using epochs that are particularly long, e.g., one such seed is produced every one month. That is, although the time hint scheme in use still operates on demand, new seeds are generated in FS-PRNG2 in a prespecified low rate that is based on time. Whenever the token 130 needs to embed a time hint, it uses the current seed of FS-PRNG2. Then, the server 150 will always be in synch with the token 130 with respect to FS-PRNG2 when using an appropriately long slack window at the server with respect to FS-PRNG2. For example, even if a forward clock attack is launched at the token 130 so that time is forwarded to k months forward, this will not introduce a desynchronization with respect to FS-PRNG2 if a corresponding slack window of at least size k is used by the server 150 for FS-PRNG2.

Generally, the time hint can refer to any information that when communicated to the server 150 reduces its search space with respect to finding the token's current epoch D+1. It may be the entire time (epoch) or a value that specifies a particular window of epochs. The current device time D+1 is the one that the token 130 uses for its current passcode generation, possibly after applying the next passcode rule.

Overall, the Time Hint Scheme is secure according to the above definition. In terms of its usability, the Time Hint scheme: (1) does not block the token 130 in the case of a notified BLOCK event, (2) does not rely on the users out-of-band communication to the server 150 or a user interface. However, the Time Hint scheme may require an auxiliary channel 1110 in the token 130.

Figure 12:
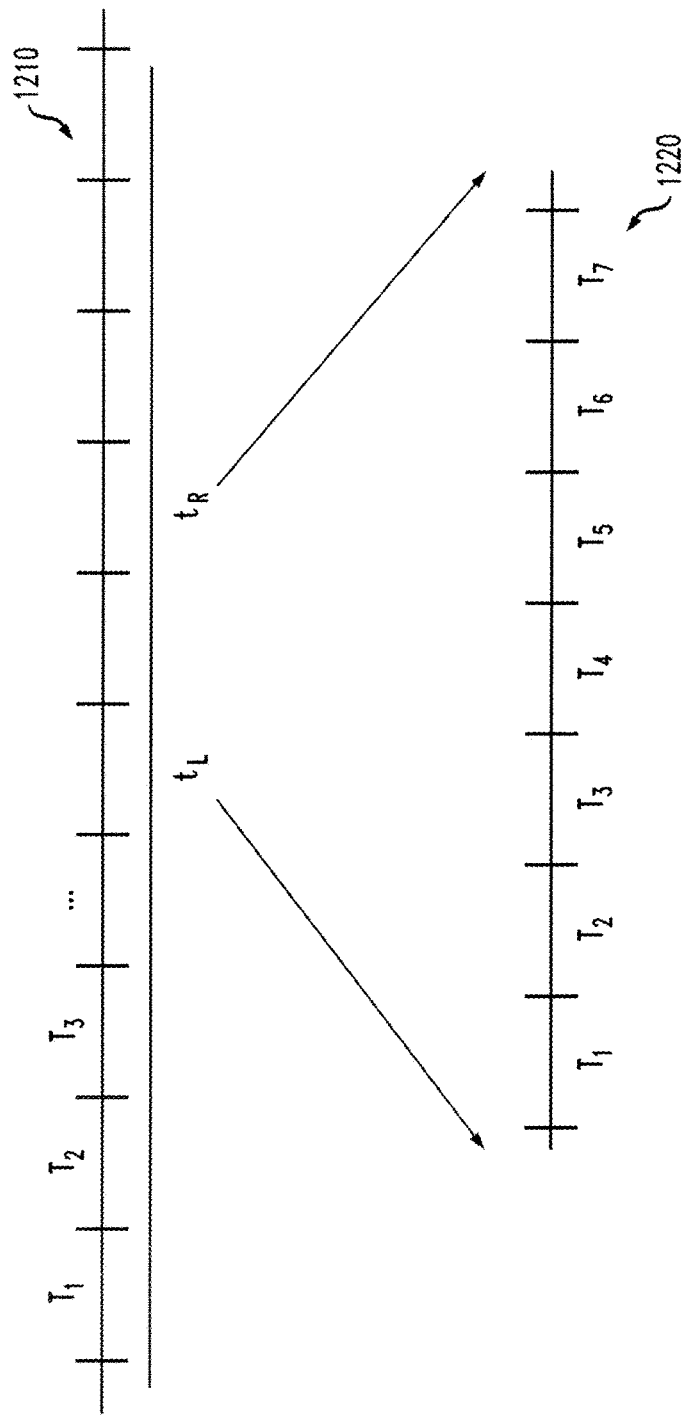
FIG. 12 illustrates the search space at the server, within which the server must find the current epoch of the token.

FIG. 12 illustrates the search space at the server 150, within which the server 150 must find the current epoch of the token 130. Time line 1210 indicates an infinite search space that is required when a time hint is not employed in accordance with the present invention. Time line 1220 indicates a finite search space that is achieved when a time hint is employed in accordance with the present invention.

As indicated above, the server 150 can employ a time hint embedded in $P_{D+1}$ by applying a function $f$ on $P_{D+1}$ to get some time-related information $TH_{D+1} = f(P_{D+1})$. Then, $TH_{D+1}$ uniquely defines, through another function h, a finite search interval $I(TH_{D+1})$ ($I(TH_{D+1}) = [t_L, t_R]$) so that it is guaranteed that $D+1 \in I(TH_{D+1})$. Therefore, the new search space 1220 for the server 150 is reduced to a finite value $|I(TH_{D+1})|$. Generally, the smaller the length of this interval, the smaller the search space for the server 150. In the exemplary embodiment of FIG. 12, $I(TH_{D+1})$ may be of the form $TH_{D+1} = [t_L, t_R]$ when, e.g., $I(TH_{D+1})$ encodes the most significant bits of value D+1.

CONCLUSION

As previously indicated, the above-described embodiments of the invention are presented by way of illustrative example only. Numerous variations and other alternative embodiments may be used, as noted above. The present invention provides new general-purpose techniques for improving resilience to forward clock attacks.

Another solution that satisfied the security definition provided herein is U.S. patent application Ser. No. 13/728,271, filed Dec. 27, 2012, entitled "Forward Secure Pseudorandom Number Generation Resilient to Forward Clock Attacks," now U.S. Pat. No. 9,083,515, incorporated by reference herein.

Additional details regarding certain conventional cryptographic techniques referred to herein may be found in, e.g., A. J. Menezes et al., Handbook of Applied Cryptography, CRC Press, 1997, which is incorporated by reference herein.

Advantageously, the illustrative embodiments do not require changes to existing communication protocols. It is therefore transparent to both existing applications and communication protocols.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

SYSTEM AND ARTICLE OF MANUFACTURE DETAILS

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It should again be emphasized that the particular authentication and communication techniques described above are provided by way of illustration, and should not be construed as limiting the present invention to any specific embodiment or group of embodiments. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A token-side method for generating a passcode from a user authentication token for presentation to an authentication server, comprising:
   determining a current state of said token;
   generating, using said token, a user authentication passcode based on said current state, wherein said generated user authentication passcode comprises an embedded time hint not previously known to said authentication server, wherein said embedded time hint is embedded in said generated user authentication passcode when said generated user authentication passcode is generated; and
   communicating said generated user authentication passcode to said authentication server, wherein said authentication server obtains said embedded time hint from said generated user authentication passcode and determines a time interval to search for another user authentication passcode based on said embedded time hint, wherein said communicating step employs one or more of (i) a verification-independent auxiliary channel that employs a plurality of auxiliary bits comprising at least one auxiliary bit indicating that said embedded time hint is activated, and (ii) a verification-dependent auxiliary channel that employs a plurality of auxiliary bits comprising at least one auxiliary bit indicating that said embedded time hint is activated and at least two independent forward-secure pseudorandom generators.

2. The method of claim 1, wherein said generating step is performed each time a user authentication passcode is generated.

3. The method of claim 1, wherein said generating step is performed upon demand when a user authentication passcode is generated.

4. The method of claim 3, wherein said generating step is performed upon detection of a forward clock attack.

5. The method of claim 3, further comprising the step of notifying said authentication server of said embedded time hint.

6. The method of claim 5, wherein said notification comprises setting a flag.

7. The method of claim 1, wherein said embedded time hint comprises an indication of a last used device time during a generation of a user authentication passcode.

8. The method of claim 1, wherein said authentication server evaluates said embedded time hint upon one or more failed authentication attempts.

9. The method of claim 1, wherein said authentication server evaluates said embedded time hint to reduce a search space for another user authentication passcode.

10. The method of claim 1, wherein said embedded time hint is encrypted using a secret key.

11. The method of claim 1, wherein said verification-dependent auxiliary channel and said user authentication passcode employ a second forward-secure pseudorandom generator of said at least two independent forward-secure pseudorandom generators that is independent of a first forward-secure pseudorandom generator employed by said verification-dependent auxiliary channel and said user authentication passcode.

12. The method of claim 11, wherein said second forward-secure pseudorandom generator generates seeds based on a low-rate time based hash chain.

13. The method of claim 11, wherein said second forward-secure pseudorandom generator generates seeds on-demand.

14. The method of claim 13, wherein said second forward-secure pseudorandom generator generates seeds on-demand in a hash chain.

15. The method of claim 11, wherein said second forward-secure pseudorandom generator is used to embed a time hint indicating a current epoch of said first forward-secure pseudorandom generator.

16. The method of claim 11, wherein said authentication server evaluates a received passcode that failed using seeds generated by said first forward-secure pseudorandom generator by employing seeds generated by said second forward-secure pseudorandom generator.

17. The method of claim 16, wherein said second forward-secure pseudorandom generator generates seeds on-demand in a hash chain and wherein said authentication server searches said seeds generated by said second forward-secure pseudorandom generator in a window of said hash chain.

18. The method of claim 16, wherein said authentication server employs said embedded time hint to update a search space with respect to said first forward-secure pseudorandom generator if said received passcode is verified using said seeds generated by said second forward-secure pseudorandom generator.

19. A non-transitory machine-readable recordable storage medium for generating a user authentication passcode for presentation to an authentication server, wherein one or more software programs when executed by one or more processing devices implement the following steps:
   determining a current state of said token;
   generating, using said token, a user authentication passcode based on said current state, wherein said generated user authentication passcode comprises an embedded time hint not previously known to said authentication server, wherein said embedded time hint is embedded in said generated user authentication passcode when said generated user authentication passcode is generated; and
   communicating said generated user authentication passcode to said authentication server, wherein said authentication server obtains said embedded time hint from said generated user authentication passcode and determines a time interval to search for another user authentication passcode based on said embedded time hint, wherein said communicating step employs one or more of (i) a verification-independent auxiliary channel that employs a plurality of auxiliary bits comprising at least one auxiliary bit indicating that said embedded time hint is activated, and (ii) a verification-dependent auxiliary channel that employs a plurality of auxiliary bits comprising at least one auxiliary bit indicating that said embedded time hint is activated and at least two independent forward-secure pseudorandom generators.

20. A token apparatus for generating a user authentication passcode for presentation to an authentication server, the apparatus comprising:
   a memory; and
   at least one hardware device, coupled to the memory, operative to implement the following steps:
   determine a current state of said token;
   generate, using said token apparatus, a user authentication passcode based on said current state, wherein said generated user authentication passcode comprises an embedded time hint not previously known to said authentication server, wherein said embedded time hint is embedded in said generated user authentication passcode when said generated user authentication passcode is generated; and communicate said generated user authentication passcode to said authentication server, wherein said authentication server obtains said embedded time hint from said generated user authentication passcode and determines a time interval to search for another user authentication passcode based on said embedded time hint, wherein said communication employs one or more of (i) a verification-independent auxiliary channel that employs a plurality of auxiliary bits comprising at least one auxiliary bit indicating that said embedded time hint is activated, and (ii) a verification-dependent auxiliary channel that employs a plurality of auxiliary bits comprising at least one auxiliary bit indicating that said embedded time hint is activated and at least two independent forward-secure pseudorandom generators.

21. The token apparatus of claim 20, wherein said generation is performed each time a user authentication passcode is generated.

22. The token apparatus of claim 20, wherein said generation is performed upon demand when a user authentication passcode is generated.

23. The token apparatus of claim 22, wherein said generation is performed upon detection of a forward clock attack.

24. The token apparatus of claim 22, wherein said at least one hardware device is further configured to notify said authentication server of said embedded time hint.

25. The token apparatus of claim 24, wherein said notification comprises setting a flag.

26. The token apparatus of claim 20, wherein said embedded time hint comprises an indication of a last used device time during a generation of a user authentication passcode.

27. The token apparatus of claim 20, wherein said authentication server evaluates said embedded time hint upon one or more failed authentication attempts.

28. The token apparatus of claim 20, wherein said authentication server evaluates said embedded time hint to reduce a search space for another user authentication passcode.

29. The token apparatus of claim 20, wherein said embedded time hint is encrypted using a secret key.

30. The token apparatus of claim 20, wherein said verification-dependent auxiliary channel and said user authentication passcode employ a second forward-secure pseudorandom generator of said at least two independent forward-secure pseudorandom generators that is independent of a first forward-secure pseudorandom generator employed by said verification-dependent auxiliary channel and said user authentication passcode.

31. The token apparatus of claim 30, wherein said second forward-secure pseudorandom generator generates seeds based on a low-rate time based hash chain.

32. The token apparatus of claim 30, wherein said second forward-secure pseudorandom generator generates seeds on-demand.

33. The token apparatus of claim 32, wherein said second forward-secure pseudorandom generator generates seeds on-demand in a hash chain.

34. The token apparatus of claim 30, wherein said second forward-secure pseudorandom generator is used to embed a time hint indicating a current epoch of said first forward-secure pseudorandom generator.

35. The token apparatus of claim 30, wherein said authentication server evaluates a received passcode that failed using seeds generated by said first forward-secure pseudorandom generator by employing seeds generated by said second forward-secure pseudorandom generator.

36. The token apparatus of claim 35, wherein said second forward-secure pseudorandom generator generates seeds on-demand in a hash chain and wherein said authentication server searches said seeds generated by said second forward-secure pseudorandom generator in a window of said hash chain.

37. The token apparatus of claim 35, wherein said authentication server employs said embedded time hint to update a search space with respect to said first forward-secure pseudorandom generator if said received passcode is verified using said seeds generated by said second forward-secure pseudorandom generator.

38. A server-side method for processing a user authentication passcode, comprising:

receiving a user authentication passcode, generated using a token, wherein said received user authentication passcode comprises an embedded time hint not previously known to said authentication server, wherein said embedded time hint is embedded in said generated user authentication passcode when said generated user authentication passcode is generated, wherein said receiving step employs one or more of (i) a verification-independent auxiliary channel that employs a plurality of auxiliary bits comprising at least one auxiliary bit indicating that said embedded time hint is activated, and (ii) a verification-dependent auxiliary channel that employs a plurality of auxiliary bits comprising at least one auxiliary bit indicating that said embedded time hint is activated and at least two independent forward-secure pseudorandom generators;

obtaining, by at least one processing device of said server, said embedded time hint from said received user authentication passcode; and determining, by said at least one processing device of said server, a time interval to search for another user authentication passcode based on said embedded time hint.

39. The server-side method of claim 38, further comprising the step of receiving a notification of said embedded time hint.

40. The server-side method of claim 39, wherein said notification comprises a flag.

41. The server-side method of claim 38, wherein said embedded time hint comprises an indication of a last used device time during a generation of a user authentication passcode.

42. The server-side method of claim 38, further comprising the step of evaluating said embedded time hint upon one or more failed authentication attempts.

43. The server-side method of claim 38, further comprising the step of evaluating said embedded time hint to reduce a search space for another user authentication passcode.

44. The server-side method of claim 38, wherein said embedded time hint is encrypted using a secret key.

45. The server-side method of claim 38, wherein said verification-dependent auxiliary channel and said user authentication passcode employ a second forward-secure pseudorandom generator of said at least two independent forward-secure pseudorandom generators that is independent of a first forward-secure pseudorandom generator employed by said verification-dependent auxiliary channel and said user authentication passcode.

46. The server-side method of claim 45, wherein said second forward-secure pseudorandom generator generates seeds based on a low-rate time based hash chain.

47. The server-side method of claim 45, wherein said second forward-secure pseudorandom generator generates seeds on-demand.

48. The server-side method of claim 45, wherein said second forward-secure pseudorandom generator is used to embed a time hint indicating a current epoch of said first forward-secure pseudorandom generator.

49. The server-side method of claim 45, wherein said authentication server evaluates a received passcode that failed using seeds generated by said first forward-secure pseudorandom generator by employing seeds generated by said second forward-secure pseudorandom generator.

50. The server-side method of claim 45, wherein said authentication server employs said embedded time hint to update a search space with respect to said first forward-secure pseudorandom generator if said received passcode is verified using said seeds generated by said second forward-secure pseudorandom generator.

51. A non-transitory machine-readable recordable storage medium for processing a user authentication passcode, wherein one or more software programs when executed by one or more processing devices implement the following steps:
    receiving a user authentication passcode, generated using a token, wherein said received user authentication passcode comprises an embedded time hint not previously known to an authentication server, wherein said embedded time hint is embedded in said generated user authentication passcode when said generated user authentication passcode is generated, wherein said receiving step employs one or more of (i) a verification-independent auxiliary channel that employs a plurality of auxiliary bits comprising at least one auxiliary bit indicating that said embedded time hint is activated, and (ii) a verification-dependent auxiliary channel that employs a plurality of auxiliary bits comprising at least one auxiliary bit indicating that said embedded time hint is activated and at least two independent forward-secure pseudorandom generators;
    obtaining, by at least one processing device of said authentication server, said embedded time hint from said received user authentication passcode; and
    determining, by said at least one processing device of said authentication server, a time interval to search for another user authentication passcode based on said embedded time hint.

52. A server apparatus for processing a user authentication passcode, the apparatus comprising:
    a memory; and
    at least one processing device, coupled to the memory, operative to implement the following steps:
    receive a user authentication passcode, generated using a token, wherein said received user authentication passcode comprises an embedded time hint not previously known to said authentication server, wherein said embedded time hint is embedded in said generated user authentication passcode when said generated user authentication passcode is generated, wherein said receiving employs one or more of (i) a verification-independent auxiliary channel that employs a plurality of auxiliary bits comprising at least one auxiliary bit indicating that said embedded time hint is activated, and (ii) a verification-dependent auxiliary channel that employs a plurality of auxiliary bits comprising at least one auxiliary bit indicating that said embedded time hint is activated and at least two independent forward-secure pseudorandom generators;
    obtain, by said at least one processing device of said server apparatus, said embedded time hint from said received user authentication passcode; and
    determine, by said at least one processing device of said server apparatus, a time interval to search for another user authentication passcode based on said embedded time hint.

53. The server apparatus of claim 52, wherein said at least one hardware device is further configured to receive a notification of said embedded time hint.

54. The server apparatus of claim 53, wherein said notification comprises a flag.

55. The server apparatus of claim 52, wherein said embedded time hint comprises an indication of a last used device time during a generation of a user authentication passcode.

56. The server apparatus of claim 52, wherein said at least one hardware device is further configured to evaluate said embedded time hint upon one or more failed authentication attempts.

57. The server apparatus of claim 52, wherein said at least one hardware device is further configured to evaluate said embedded time hint to reduce a search space for another user authentication passcode.

58. The server apparatus of claim 52, wherein said embedded time hint is encrypted using a secret key.

59. The server apparatus of claim 52, wherein said verification-dependent auxiliary channel and said user authentication passcode employ a second forward-secure pseudorandom generator of said at least two independent forward-secure pseudorandom generators that is independent of a first forward-secure pseudorandom generator employed by said verification-dependent auxiliary channel and said user authentication passcode.

60. The server apparatus of claim 59, wherein said second forward-secure pseudorandom generator generates seeds based on a low-rate time based hash chain.

61. The server apparatus of claim 59, wherein said second forward-secure pseudorandom generator generates seeds on-demand.

62. The server apparatus of claim 59, wherein said second forward-secure pseudorandom generator is used to embed a time hint indicating a current epoch of said first forward-secure pseudorandom generator.

63. The server apparatus of claim 59, wherein said server apparatus evaluates a received passcode that failed using seeds generated by said first forward-secure pseudorandom generator by employing seeds generated by said second forward-secure pseudorandom generator.

64. The server apparatus of claim 59, wherein said server apparatus employs said embedded time hint to update a search space with respect to said first forward-secure pseudorandom generator if said received passcode is verified using said seeds generated by said second forward-secure pseudorandom generator.

* * * * *